United States Patent
Liu et al.

(10) Patent No.: US 10,887,597 B2
(45) Date of Patent: Jan. 5, 2021

(54) SYSTEMS AND METHODS OF DETERMINING ILLUMINATION COMPENSATION PARAMETERS FOR VIDEO CODING

(71) Applicant: QUALCOMM Incorporated, San Diego, CA (US)

(72) Inventors: Hongbin Liu, San Diego, CA (US);
Ying Chen, San Diego, CA (US);
Jianle Chen, San Diego, CA (US);
Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/174,820

(22) Filed: Jun. 6, 2016

(65) Prior Publication Data

US 2016/0366415 A1 Dec. 15, 2016

Related U.S. Application Data

(60) Provisional application No. 62/173,234, filed on Jun. 9, 2015.

(51) Int. Cl.
*H04N 19/136* (2014.01)
*H04N 19/51* (2014.01)
(Continued)

(52) U.S. Cl.
CPC ......... *H04N 19/136* (2014.11); *H04N 19/119* (2014.11); *H04N 19/139* (2014.11);
(Continued)

(58) Field of Classification Search
None
See application file for complete search history.

(56) References Cited

U.S. PATENT DOCUMENTS 6,490,356 B1* 12/2002 Beuque ............... G06F 9/4843
380/239
9,924,191 B2 3/2018 Chen et al.
(Continued)

FOREIGN PATENT DOCUMENTS

CN 102215389 A 10/2011
CN 102763418 A 10/2012
(Continued)

OTHER PUBLICATIONS

Liu, Hongbin et al., "3D-CE1/h related: Illumination Compensation for Inter-View Prediction", Input Document to Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, JCT2-A0086 (Jul. 11, 2012).*
(Continued)

*Primary Examiner* — Lindsay J Uhl
(74) *Attorney, Agent, or Firm* — Polsinelli LLP

(57) ABSTRACT

Techniques and systems are provided for coding video data. For example, a method of coding video data includes determining one or more illumination compensation parameters for a current block and coding the current block as part of an encoded bitstream using the one or more illumination compensation parameters. In some cases, the method can include determining one or more spatially neighboring samples for the current block and deriving the one or more illumination compensation parameters for the current block based on at least one of the one or more spatially neighboring samples. The method can further include signaling, individually, for the current block, an illumination compensation status in the encoded bitstream. The method can further include signaling at least one of the one or more illumination compensation parameters for the current block in the encoded bitstream.

52 Claims, 12 Drawing Sheets

(51) Int. Cl.

| | |
|---|---|
| H04N 19/119 | (2014.01) |
| H04N 19/139 | (2014.01) |
| H04N 19/176 | (2014.01) |
| H04N 19/70 | (2014.01) |
| H04N 19/577 | (2014.01) |
| H04N 19/82 | (2014.01) |
| H04N 19/463 | (2014.01) |

(52) U.S. Cl.
CPC ......... *H04N 19/176* (2014.11); *H04N 19/463* (2014.11); *H04N 19/51* (2014.11); *H04N 19/577* (2014.11); *H04N 19/70* (2014.11); *H04N 19/82* (2014.11)

(56) References Cited

U.S. PATENT DOCUMENTS

| | | | |
|---|---|---|---|
| 2003/0152149 A1 | 8/2003 | Denolf | |
| 2007/0177672 A1* | 8/2007 | Yang | H04N 5/455 375/240.25 |
| 2008/0304760 A1* | 12/2008 | Lee | H04N 19/597 382/238 |
| 2010/0027881 A1* | 2/2010 | Kim | H04N 19/597 382/166 |
| 2011/0007800 A1* | 1/2011 | Zheng | H04N 19/105 375/240.12 |
| 2011/0176611 A1 | 7/2011 | Huang et al. | |
| 2013/0243088 A1* | 9/2013 | Lim | H04N 19/52 375/240.12 |
| 2013/0294519 A1 | 11/2013 | Gilmutdinov et al. | |
| 2014/0003522 A1* | 1/2014 | Park | H04N 19/109 375/240.16 |
| 2014/0184740 A1 | 7/2014 | Zhang et al. | |
| 2015/0023422 A1 | 1/2015 | Zhang et al. | |
| 2016/0366416 A1 | 12/2016 | Liu et al. | |

FOREIGN PATENT DOCUMENTS

| | | |
|---|---|---|
| CN | 102970543 A | 3/2013 |
| CN | 103260024 A | 8/2013 |
| JP | 2008514122 A | 5/2008 |
| WO | 2006033953 A1 | 3/2006 |
| WO | 2010035731 A1 | 4/2010 |
| WO | 2014103606 A1 | 7/2014 |
| WO | 2014166104 A1 | 10/2014 |
| WO | 2014166360 A1 | 10/2014 |

OTHER PUBLICATIONS

Liu, Hongbin et al., "CE1: Simplifications to sub-PU level inter-view motion prediction", Input Document to Joint Collaborative Team on 3D Video Coding Extension Development of ITU-T SG 16 WP 3 and ISO/IEC JTC 1/SC 29/WG 11, 7th Meeting: San Jose, US, Jan. 11-17, 2014, JCT3V-G0120 (Jan. 7, 2014) (Year: 2014).*

Chen, Yi-Wen et al., "3D-CE4: On complexity reduction of bi-prediction for illumination compensation", Input Document to Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, JCT3V-E0168 (Jul. 19, 2013) (Year: 2013).*

Zhang, Kai et al., "3D-CE5.h: Removal of parsing dependency for illumination compensation", Input Document to Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013 (Mar. 27, 2013) (Year: 2013).*

Liu, H., et al., 3D-CE1.h related: Illumination Compensation for Inter-View Prediction, Joint Collaborative Team on 3D Video Coding Extension Development of ITU-T SG16 WP3 and ISO/IEC JTC1/SC29/WG11, 1st Meeting: Stockholm, SE, Jul. 16-20, 2012, Document: JCT2-A0086 (Jul. 11, 2012) (Year: 2012).*

Fujibayashi, A., TE12:Performance of Partition Based Illumination Compensation (PBIC), Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-0041 (Oct. 1, 2010) (Year: 2010).*

Liu, Hongbin et al., "CE1: Simplifications to sub-PU level inter-view motion prediction", Joint Collaborative Team on 3D Video Coding Extension Development of ITU-T SG16 WP3 and ISO/IEC JTC1/SC29/WG11, 7th Meeting: San Jose, US, Jan. 11-17, 2014, JCT3V-G0120 (Jan. 7, 2014) (Year: 2014).*

Chen, Y. et al., "3D-CE4: On complexity reduction of bi-prediction for illumination compensation", Joint Collaborative Team on 3D Video Coding Extension Development of ITU-T SG16 WP3 and ISO/IEC JTC1/SC29/WG11, 5th Meeting: Vienna, AT, Jul. 27-Aug. 2, 2013, JCT3V-E0168 (Jul. 19, 2013) (Year: 2013).*

Zhang, Kai et al., "3D-CE5.h: Removal of parsing dependency for illumination compensation", Joint Collaborative Team on 3D Video Coding Extension Development of ITU-T SG16 WP3 and ISO/IEC JTC1/SC29/WG11, 4th Meeting: Incheon, KR, Apr. 20-26, 2013, JCT3V-D152 (Mar. 27, 2013) (Year: 2013).*

Liu, H. et al., "CE1: Simplifications to sub-PU level inter-view motion prediction", Input Document to Joint Collaborative Team on 3D Video Coding Extension Development of ITU-T SG16 WP3 and ISO/IEC JTC1/SC29/WG11, 7th Meeting: San Jose, US, Jan. 11-17, 2014, JCT3V-G0120 (Jan. 7, 2014) (Year: 2014).*

Chen, Y. et al., "3D-CE4: On complexity reduction of bi-prediction for illumination compensation", Input Doc. to Joint Collaborative Team on 3D Video Coding Extension Development of ITU-T SG16 WP3 and ISO/IEC JTC1/SC29/WG11, 5th Meeting: Vienna, AT, Jul. 27-Aug. 2, 2013 JCT3V-E0168 (Jul. 19, 2013) (Year: 2013).*

Zhang, K et al., "3D-CE5.h: Removal of parsing dependency for illumination compensation", Input Document to Joint Collaborative Team on 3D Video Coding Extension Development of ITU-T SG16 WP3 and ISO/IEC JTC1/SC29/WG11, 4th Meeting: Incheon, KR, Apr. 20-26, 2013 JCT3V-D152 (Mar. 27, 2013) (Year: 2013).*

Liu, Hongbin et al., "CE1: Simplifications to sub-PU level inter-view motion prediction", Input Document to Joint Collaborative Team on 3D Video Coding Extension Development of ITU-T SG 16 WP 3 and ISO/IEC JTC 1/SC 29/WG 11, 7th Meeting: San Jose, US, Jan. 11-17, 2014, JCT3V-G0120 (Jan. 7, 2014) (Year: 2014).*

Zhang, Kai et al., "3D-CE5.h: Removal of parsing dependency for illumination compensation", Input Document to Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, JCT3V-D152 (Mar. 27, 2013) (Year: 2013).*

Alshina E., et al., "Performance of JEM 1.0 Tools Analysis", 2. JVET Meeting, Feb. 20, 2016-Feb. 26, 2016, San Diego, (the Joint Video Exploration Team of ISO/IEC JTC1/SC291WG11 and ITU-T SG.16), URL: http://phenix.int-evry.fr/jvet/, No. JVET-B0022-v2, Feb. 17, 2016 (Feb. 17, 2016), pp. 1-28, XP030150010.

Li D-X., et al., "Optimising Inter-View Prediction Structure for Multiview Video Coding with Minimum Spanning Tree", Electronics Letters, IET Stevenage, GB, vol. 43, No. 23, Nov. 8, 2007 (Nov. 8, 2007), pp. 1269-1271, XP006029929, ISSN: 0013-5194, DOI: 10.1049/EL:20072465.

Liu H., et al., "3D-CE2.h: Results of Illumination Compensation for Inter-View Prediction", 2. JCT-3V Meeting, 102, MPEG Meeting, Oct. 13, 2012-Oct. 19, 2012, Shanghai, (the Joint Collaborative Team on 3D Video Coding Extension Development of ISO/IEC JTC1/SC29/WG11 and ITU-T SG.16), URL: http://phenix.int-evry.fr/jct2/, No. JCT3V-B0045, Oct. 9, 2012 (Oct. 9, 2012), pp. 1-5, XP030130226.

Qualcomm Incorporated, "Coding tools investigation for next generation video coding", ITU, Telecommunication Standardization Sector, COM 16-C 806—E, Jan. 2015, 7 Pages.

Fujibavashi A., et al., "TE12: Performance of Partition Based Illumination Compensation (PBIC)", 3. JCT-VC Meeting, 94, MPEG Meeting, Oct. 7, 2010-Oct. 15, 2010, Guangzhou, (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-C041, Oct. 1, 2010 (Oct. 1, 2010), XP030007748.

International Search Report and Written Opinion—PCT/US2016/036159—ISA/EPO—dated Oct. 4, 2016.

Seo C-W., et al., "Pixel Based Illumination Compensation", 6. JCT-VC Meeting, 97, MPEG Meeting, Jul. 14, 2011-Jul. 22, 2011,

(56) References Cited

OTHER PUBLICATIONS

Torino; (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-F417, Jul. 1, 2011 (Jul. 1, 2011), XP030009440, the whole document.

Chiu Y.J., et al., "Decoder-side Motion Estimation and Wiener filter for HEVC", 2013 Visual Communications and Image Processing (VCIP), IEEE, Nov. 17, 2013 (Nov. 17, 2013), pp. 1-6, XP032543658, DOI: 10.1109/VCIP.2013.6706446 [retrieved on Jan. 8, 2014].

ITU-T H.263 "Series H: Audiovisual and Multimedia Systems Infrastructure of audiovisual service—Coding of moving video: Video coding for low bitrate communication," (Jan. 2005), 226 pages.

Kamp S., et al., "Decoder-Side Motion Vector Derivation for Block-Based Video Coding", IEEE transactions on circuits and systems for video technology, vol. 22, No. 12, 2012, pp. 1732-1745.

Liu H., et al., "3D-CE1.h related: Illumination Compensation for Inter-View Prediction", 1. JCT-3V Meeting; 101. MPEG Meeting; Jul. 16, 2012-Jul. 20, 2012; Stockholm; (the Joint Collaborative Team on 3D Video Coding Extension Development of ISO/IEC JTC1/SC29/WG11 and ITU-T SG.16); URL: http://phenix.int-evry.fr/jct2/,, No. JCT3V-A0086, pp. 1-7, Jul. 11, 2012 (Jul. 11, 2012), XP030130085.

Tech G., et al., "3D-HEVC Draft Text 7", Joint Collaborative Team on 3D Video Coding Extensions of ITU-T SG 16 WP 3 and ISO/IEC JTC 1/SC 29/WG 11(JCT-3V), Doc. JCT3V-K1001-v9, 11th Meeting: Geneva, Switzerland, Feb. 12-18, 2015, 101 pages.

An J., et al., "3D-CE3: Sub-PU Level Inter-View Motion Prediction", 6, JCT-3V Meeting, Oct. 25, 2013-Nov. 1, 2013, Geneva, (the Joint Collaborative Team on 3D Video Coding Extension Development of ISO/IEC JTC1/SC29/WG11 and ITU-T SG.16), URL: http://phenix.int-evry.fr/jct2/, No. JCT3V-F0110, Oct. 19, 2013 (Oct. 19, 2013), pp. 1-4, XP030131526.

Kimata H., et al., "Editors input on Joint Multiview Video Model (JMVM) 7.0", 26, JVT Meeting, 83, MPEG Meeting, Jan. 13, 2008-Jan. 18, 2008, Antalya, (Joint Video Team of ISO/IEC JTC1/SC29/WG11 and ITU-T SG.16), No. JVT-Z007, Jan. 11, 2008 (Jan. 11, 2008), pp. 1-16, XP030007306, ISSN: 0000-0136.

Liu H., et al., "CE1: Simplifications to Sub-PU Level Inter-view Motion Prediction," 7, JCT-3V Meeting; Jan. 11, 2014-Jan. 17, 2014; San Jose; (the Joint Collaborative Team on 3D Video Coding Extension Development of ISO/IEC JTC1/SC29/WG11 and ITU-T SG.16 ); URL: http://phenix.int-evry.fr/jct2/ No. JCT3V-G0120-v2, Jan. 8, 2014 (Jan. 8, 2014). XP030131894, 4 pages.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015), 4 Pages, XP030003883.

Partial International Search Report—PCT/US2016/036159—ISA/EPO—Aug. 3, 2016.

Yang J-H., "CE5: Illumination Comp. Info. Derivation for MVC", 23, JVT Meeting, 80, MPEG Meeting, Apr. 21, 2007-Apr. 27, 2007, San Josa CR, US, (Joint Video Team of ISO/IEC JTC1/SC29/WG11 and ITU-T SG.16), No. JVT-W031, Apr. 25, 2007 (Apr. 25, 2007), pp. 1-8, XP030006991, ISSN: 0000-0155.

Zhang K., et al., "3D-CE5.h related: Removal of Parsing Dependency for Illumination Compensation", 4, JCT-3V Meeting, Apr. 20, 2013-Apr. 26, 2013, Incheon, (the Joint Collaborative Team on 3D Video Coding Extension Development pf ISO/IEC JTC1/SC29/WG11 and ITU-T SG.16), URL: http://phenix.int-evry.fr/jct2/, No. JCT3V-D0152, Apr. 13, 2013 (Apr. 13, 2013), pp. 1-4, XP030130816, the whole document.

Alshina E., et al., "Performance of JEM1.0 tools analysis by Samsung," Joint Video Exploration Team (JVET) of ITU-SG 16 WP 3 and ISO/IEC JTC 1/SC 29/WG 11,2nd Meeting: San Diego, USA, Feb. 20-26, 2016, Document: JVET-B0022_r1, 28 pages.

Kai Z., et al., "3D/MV-HEVC HLS: HEVC compatible slice segment header in 3D-HEVC", Joint Collaborative Team on 3D Video Coding Extension Development of ITU-T SG 16 WP 3 and ISO/IEC JTC1/SC 29/WG 11 6th Meeting: Geneva, CH, Oct. 23-Nov. 1, 2013, [JCT3V-F0044], Oct. 19, 2013, JCT3V-F0044 (version 2), pp. 1-3.

\* cited by examiner

FIG. 2

CURRENT CU

REFERENCE BLOCK

SYSTEMS AND METHODS OF DETERMINING ILLUMINATION COMPENSATION PARAMETERS FOR VIDEO CODING

CROSS-REFERENCE TO RELATED APPLICATIONS

This application claims the benefit of U.S. Provisional Application No. 62/173,234, filed Jun. 9, 2015, which is hereby incorporated by reference, in its entirety. This application is related to U.S. application Ser. No. 15/174,834, titled "SYSTEMS AND METHODS OF DETERMINING ILLUMINATION COMPENSATION STATUS FOR VIDEO CODING," filed on the same date herewith, which is hereby incorporated herein by reference, in its entirety.

FIELD

This disclosure relates generally to video coding. More specifically, this disclosure relates to systems and methods for performing illumination compensation for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as coding tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

BRIEF SUMMARY

In some embodiments, techniques and systems are described for deriving or signaling one or more illumination compensation parameters based on one or more spatially neighboring samples. A video encoder can use illumination compensation to efficiently compensate variations in illumination between one or more pictures. The video encoder can determine one or more illumination compensation parameters for a coding block being encoded or for a coding unit, prediction unit, sub-prediction unit, or other coding block, coding unit, or prediction unit. Illumination compensation parameters can include an offset, one or more scaling factors, a shift number, or other suitable illumination compensation parameters. The illumination compensation parameters can be signaled in the bitstream or can be determined based on one or more of a reference block, a neighboring block, particular samples (e.g., pixels), or other information. A video decoder can utilize the illumination compensation parameters and/or other data to construct predictive data for decoding the current block.

According to at least one example, a method of coding video data is provided that includes determining one or more illumination compensation parameters for a current block and coding the current block as part of an encoded bitstream using the one or more illumination compensation parameters.

In another example, an apparatus is provided that includes a memory configured to store video data and a processor. The processor is configured to and may determine one or more illumination compensation parameters for a current block. The processor is further configured to and may code the current block as part of an encoded bitstream using the one or more illumination compensation parameters.

In another example, a computer readable medium is provided having stored thereon instructions that when executed by a processor perform a method that includes: determining one or more illumination compensation parameters for a current block; and coding the current block as part of an encoded bitstream using the one or more illumination compensation parameters.

In another example, an apparatus is provided that includes means for determining one or more illumination compensation parameters for a current block and means for coding the current block as part of an encoded bitstream using the one or more illumination compensation parameters.

In some aspects, the method, apparatuses, and computer readable medium described above may further include determining one or more illumination compensation parameters for a current block and coding the current block as part of an encoded bitstream using the one or more illumination compensation parameters.

In some aspects, the method, apparatuses, and computer readable medium described above may further include: determining one or more spatially neighboring samples for the current block; deriving the one or more illumination compensation parameters for the current block based on at least one of the one or more spatially neighboring samples;

coding the current block as part of the encoded bitstream using the one or more illumination compensation parameters; and signaling, individually, for the current block, an illumination compensation status in the encoded bitstream.

In some aspects, the one or more spatially neighboring samples are at least one or more of the following: one or more reconstructed spatially neighboring samples of the current block; and/or one or more corresponding samples to the one or more reconstructed spatially neighboring samples of the current block in a reference picture identified by motion information associated with the current block.

In some aspects, the motion information associated with the current block used to identify the one or more corresponding samples includes representative motion information of the current block when a sub-PU based temporal or spatial prediction mode is used for the current block.

In some aspects, the one or more spatially neighboring samples comprises a plurality of neighboring samples, and wherein the at least one of the spatially neighboring samples includes less than all of the plurality of neighboring samples.

In some aspects, the method, apparatuses, and computer readable medium described above may further include signaling at least one of the one or more illumination compensation parameters for the current block in the encoded bitstream.

In some aspects, the current block is coded using an inter prediction mode that copies or derives motion information from a candidate block, and the one or more illumination compensation parameters are derived to be the same as one or more illumination compensation parameters of the candidate block.

In some aspects, the current block is coded using a merge mode, and the one or more illumination compensation parameters for the current block are derived to be the same as the one or more illumination compensation parameters of the candidate block.

In some aspects, the candidate block is at least one or more of a spatial merge candidate, a temporal merge candidate, or a bi-predictive merge candidate.

In some aspects, the illumination compensation status for the current block is explicitly signaled in the encoded bitstream when the current block is coded using an inter prediction mode that signals the motion information of the current block explicitly in the encoded bitstream.

In some aspects, the one or more illumination compensation parameters for the current block are explicitly signaled in the encoded bitstream.

In some aspects, the one or more illumination compensation parameters for both reference picture lists (reference picture list 0 and reference picture list 1) for the current block are jointly signaled in the encoded bitstream. For example, an index is signaled to indicate the value of illumination compensation parameters for both reference picture lists (list 0 and list 1).

In some aspects, the one or more illumination compensation parameters for the current block are explicitly signaled in the encoded bitstream when the current block is coded using an advanced motion vector prediction (AMVP) mode.

In some aspects, the method, apparatuses, and computer readable medium described above may further include deriving a list of multiple sets of one or more illumination compensation parameters for the current block, wherein signaling the one or more illumination compensation parameters comprises signaling a selection of one of the multiple sets.

In some aspects, the method, apparatuses, and computer readable medium described above may further include signaling the illumination compensation parameters for a slice comprising the current block in a slice header. In some aspects, the method, apparatuses, and computer readable medium described above may further include signaling the illumination compensation parameters for a CTU comprising the current block. In some aspects, the method, apparatuses, and computer readable medium described above may further include signaling the illumination compensation parameters for a group of blocks comprising the current block, or another other block level comprising the current block.

In some aspects, the method, apparatuses, and computer readable medium described above may further include signaling illumination compensation parameters for chroma and luma separately.

In some aspects, the one or more illumination compensation parameters include at least one or more of a scale or an offset.

In some aspects, the method is executable on a wireless communication device. The wireless communication device comprises a memory configured to store the video data, a processor configured to execute instructions to process the video data stored in the memory, and a receiver configured to receive the encoded bitstream. In some aspects, the wireless communication device is a cellular telephone and the encoded video bitstream is modulated according to a cellular communication standard.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 2 is a block diagram illustrating examples of partition modes for coding units.

DETAILED DESCRIPTION

Figure 1:
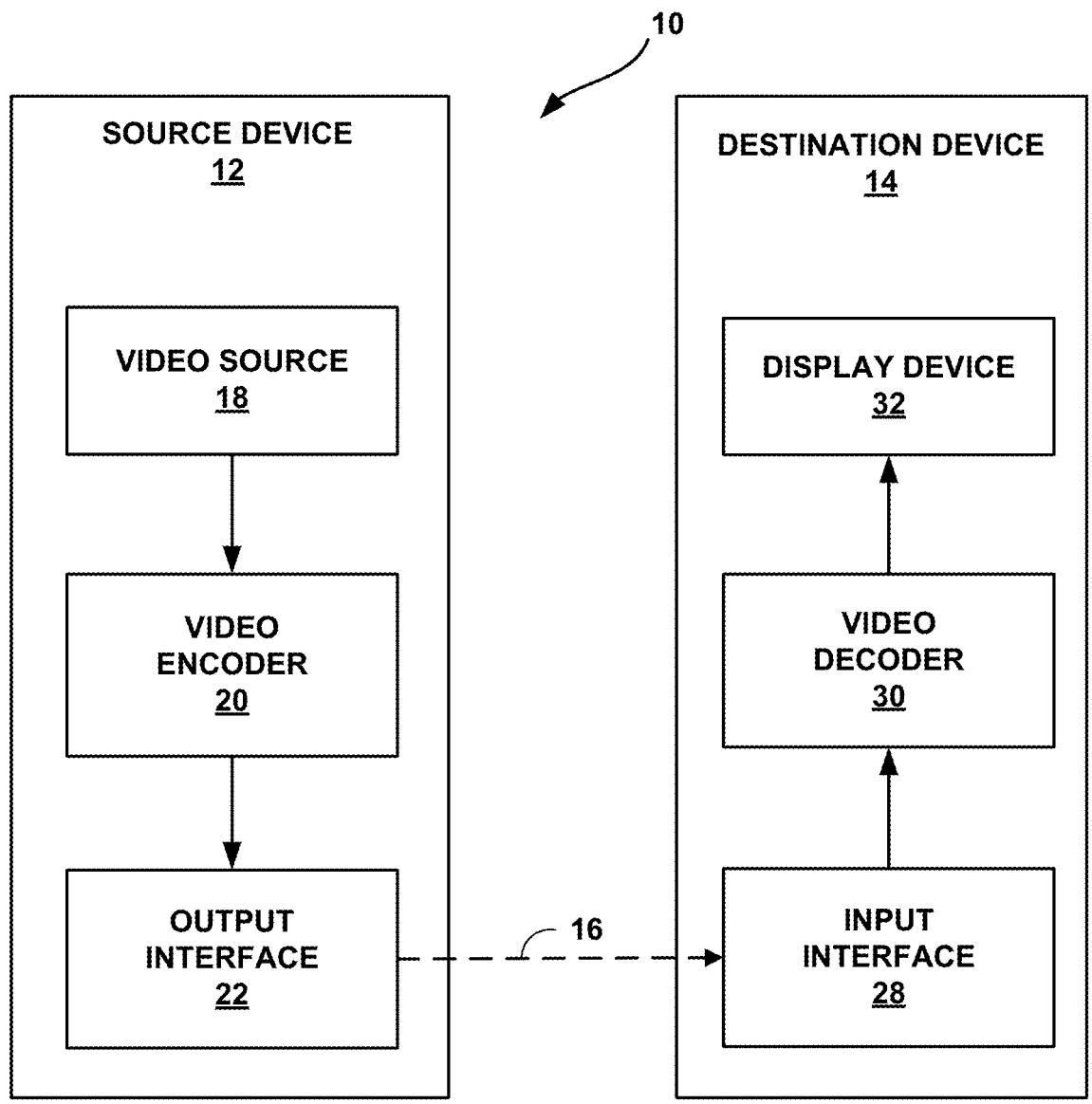
FIG. 1 is a block diagram illustrating an example video encoding and decoding system that may implement techniques of this disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video coding using video encoders and decoders are described herein. For example, one or more systems and methods of coding are directed to applying illumination compensation (IC) in block based video coding. The techniques can be applied to any of the existing video codecs (e.g., High Efficiency Video Coding (HEVC), Advanced Video Coding (AVC), or other suitable existing video codec), or can be an efficient coding tool for any future video coding standards.

Video coding devices implement video compression techniques to encode and decode video data efficiently. Video compression techniques may include applying spatial prediction (e.g., intra-frame prediction or intra-prediction), temporal prediction (e.g., inter-frame prediction or inter-prediction), and/or other prediction techniques to reduce or remove redundancy inherent in video sequences. A video encoder typically partitions each picture of an original video sequence into rectangular regions referred to as video blocks or coding units (described in greater detail below). These video blocks may be encoded using a particular prediction mode.

Video blocks may be divided in one or more ways into one or more groups of smaller blocks (e.g., coding tree blocks (CTB), prediction blocks (PB), transform blocks (TB)), each group individually representing the entire video block, as further described herein. Accordingly, references generally to blocks, unless otherwise specified, may refer to such video blocks (e.g., coding tree blocks (CTB), coding blocks, etc.), prediction blocks, transform blocks, or other appropriate blocks or sub-blocks, as would be understood by one of ordinary skill in the art. Further, each of these blocks may also interchangeably be referred to herein as "units" (e.g., coding tree unit (CTU), coding unit, prediction unit (PU), transform unit (TU), etc.). One of ordinary skill in the art will recognize that a unit may indicate a coding logical unit that is encoded in a bitstream, while a block may indicate a portion of video frame buffer a process is target to.

For inter-prediction modes, a video encoder typically searches for a block similar to the block being encoded in a frame located in another temporal location, referred to as a reference frame. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some instances, a video encoder can use illumination compensation (IC) to efficiently code variations in illumination (e.g., brightness) between one or more pictures. The video encoder can determine one or more IC parameters (e.g., offset, one or more scaling factors, shift number (may be fixed), or other suitable IC parameters) for the coding block being encoded or for a coding unit, prediction unit, sub-prediction unit, or other coding block, coding unit, or prediction unit. The IC parameters can be determined based on one or more of a reference block, a neighboring block, particular samples (e.g., pixels), or other information. The video encoder can include an indicator (e.g., one or more bits) and/or the IC parameters for the block being encoded in an encoded bitstream. The indicator can also be referred to as a flag. The indicator and/or the IC parameters can be encoded as part of the syntax elements in the encoded bitstream. The video decoder can utilize the flag, IC parameters, and/or other data to construct predictive data for decoding the current block.

According to aspects of this disclosure, a video coder (e.g., a video encoder or a video decoder) may derive IC parameters and/or signal whether a block uses IC when coding for a bitstream. For example, the video coder may insert IC information including at least one or more of an indication of how IC is used, an indication of the IC parameters used, the IC parameters themselves in the encoded bitstream, or any combination thereof. The video coder may further decode the encoded bitstream based on the IC information in the encoded bitstream.

FIG. 1 is a block diagram illustrating an example video encoding and decoding system 10 that can utilize techniques for deriving motion information, performing block partitioning, performing illumination compensation (IC), and/or perform other coding operations. As shown in FIG. 1, system 10 includes a source device 12 that provides encoded video data to be decoded at a later time by a destination device 14. In particular, source device 12 provides the video data to destination device 14 via a computer-readable medium 16.

Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for deriving motion information, performing block partitioning, and/or performing IC. In other examples, a source device and a destination device may include other components or arrangements. For example, source device 12 may receive video data from an external video source 18, such as an external camera. Likewise, destination device 14 may interface with an external display device 32, rather than including an integrated display device.

The illustrated system 10 of FIG. 1 is merely one example. Techniques for deriving motion information, performing block partitioning, and/or performing IC may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., Group of Pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data that can be used to decode the compressed (encoded) video data. Such communication may occur in real-time or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 may operate according to a video coding standard. Example video coding standards developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG) include High Efficiency Video Coding (HEVC) or ITU-T H.265, including its range extension, multiview extension (MV-HEVC) and scalable extension (SHVC). The finalized HEVC standard document is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013. Alternatively, video encoder 20 and video decoder 30 may operate according to other proprietary or industry standards, such as ISO/IEC MPEG-4 Visual and ITU-T H.264 (also known as ISO/IEC MPEG-4 AVC), including its Scalable Video Coding (SVC) extension and Multiview Video Coding (MVC) extension. The techniques of this disclosure, however, are not limited to any particular coding standard. For example, the techniques of this disclosure may be used with a variety of other proprietary or non-proprietary video coding techniques or subsequent standards, such as ITU-T H.266.

As noted above, for inter-prediction modes, video encoder 20 may search for a block similar to the one being encoded (a "current block") in a picture of another temporal location, referred to as a reference picture. The information used to identify the reference picture may be referred to as motion information. For example, for each block, a set of motion information can be available. A set of motion information contains motion information for forward and backward prediction directions. Here, forward and backward prediction directions are two prediction directions of a bi-directional prediction mode. The terms "forward" and "backward" do not necessarily have a geometrical meaning, and may instead correspond to a reference picture list 0 (RefPicList0) and a reference picture list 1 (RefPicList1) of a current picture. When only one reference picture list is available for a picture or slice, only RefPicList0 is available and the motion information of each block of a slice can always be a forward prediction direction.

For each prediction direction, the motion information contains a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

In some cases, a motion vector together with its reference index is used in decoding processes. Such a motion vector with the associated reference index can be denoted as a uni-predictive set of motion information.

Picture order count (POC) is widely used in video coding standards to identify a display order of a picture. Although there can be cases in which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set (e.g., as in HEVC), motion vector scaling, or other suitable uses.

In H.264/AVC, each inter macroblock (MB) may be partitioned four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). When a MB is not partitioned into four 8×8 MB partitions, the MB has only one motion vector for each MB partition in each direction. When an MB is partitioned into four 8×8 MB partitions, each 8×8 MB partition can be further partitioned into sub-blocks, each of which can have a different motion vector in each direction. There are four different ways to get sub-blocks from an 8×8 MB partition including: one 8×8 sub-block; two 8×4 sub-blocks; two 4×8 sub-blocks; and four 4×4 sub-blocks. Each sub-block can have a different motion vector in each direction. Therefore, a motion vector can be present in a level equal to or higher than a sub-block.

In H.264/AVC, a temporal direct mode can be enabled in either MB or MB partition level for skip or direct mode in B slices. For each MB partition, the motion vectors of the block co-located with the current MB partition in the RefPicList1[0] of the current block are used to derive the motion vectors. Each motion vector in the co-located block is scaled based on POC distances. In AVC, a direct mode can also predict motion information from the spatial neighbors, which may be referred to as a spatial direct mode.

In HEVC, to generate an encoded representation of a picture, video encoder 20 may generate a set of coding tree units (CTUs). A coding tree block (CTB) is the largest coding unit in a slice, and contains a quad-tree with coding units as nodes. For example, a CTU may comprise a CTB of luma samples, two corresponding CTBs of chroma samples, and syntax structures used to code the samples of the CTB. In monochrome pictures or pictures having three separate color planes, a CTU may comprise a single CTB block and syntax structures used to code the samples of the CTB.

A CTB may be an N×N block of samples. The size of a CTB can range from 16×16 to 64×64 in the HEVC main profile (although technically 8×8 CTB sizes can be supported). A coding unit (CU) can be the same size as a CTB, and as small as 8×8. Each CU is coded with one prediction mode. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the CTBs of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array. The CU may further include syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Figure 2:
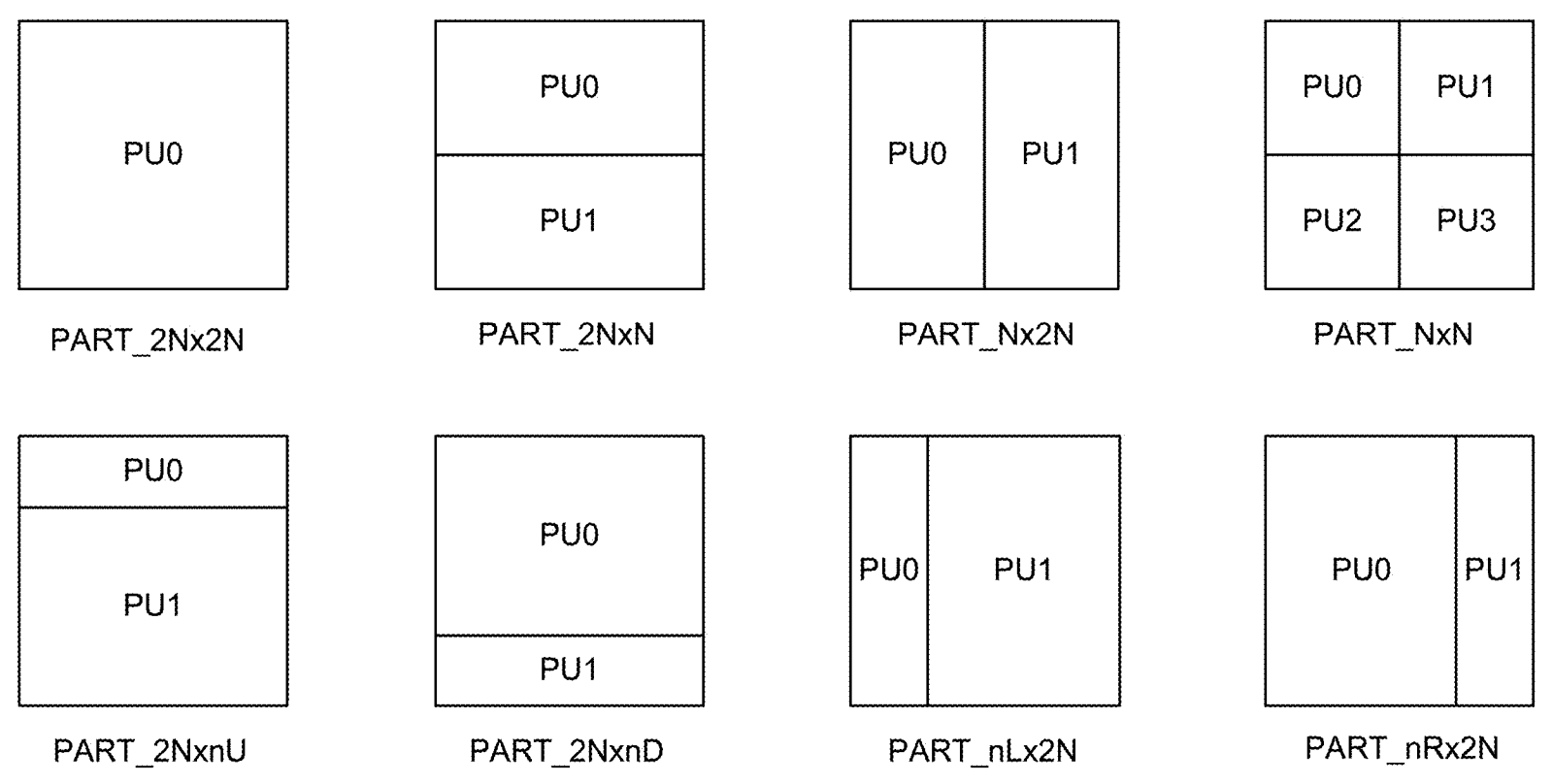

Video encoder 20 may use intra prediction or inter-prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter-prediction to generate the predictive blocks of a PU, video encoder 20 may generate the predictive blocks of the PU based on decoded samples of one or more pictures other than the picture associated with the PU. When a CU is inter-predicted (or inter-coded), the CU may be further partitioned into two or four PUs. In some cases, when a CU is inter-predicted, the CU can become just one PU when further partitioning does not apply. When two PUs are present in one CU, the two PUs may in some instances be half size rectangles or two rectangle sizes with one-fourth or three-quarters size of the CU. FIG. 2 is a block diagram illustrating examples of partition modes for CUs with inter-prediction mode. As shown, the partition modes include PART_2N×2N, PART_2N×N, PART_N×2N, PART_N×N, PART_2N×nU, PART_2N×nD, PART_nL×2N, and PART_nR×2N. A CU can be partitioned into PUs according to the different partition modes. Accordingly, a CU can be predicted using one or more of the partitioning modes.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

When a CU is inter-coded, one set of motion information is present for each CU and/or PU. In addition, each CU and/or PU is coded with a unique inter-prediction mode to derive a set of motion information. In the HEVC standard, there are two inter-prediction modes for a prediction unit (PU), including a merge mode and an advanced motion vector prediction (AMVP) mode. A skip prediction mode is considered as a special case of a merge prediction mode.

In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, the MV candidate list contains up to five candidates for the merge mode and two candidates for the AMVP mode. One of ordinary skill in the art will appreciate that other numbers of candidates can be included in an MV candidate list for the merge or AMVP modes. A merge candidate may contain a set of motion information (e.g., motion vectors) corresponding to both reference picture lists (list 0 and list 1) and the reference indices. If a merge candidate is identified by a merge index, the reference pictures associated with the merge candidate are used for the prediction of the current blocks, and the associated motion vectors are determined. Under AMVP mode for each potential prediction direction from either list 0 or list 1, a reference index needs to be explicitly signaled, together with an MVP index to the MV candidate list because an AMVP candidate contains only a motion vector. In AMVP mode, the predicted motion vectors can be further refined. Accordingly, a merge candidate corresponds to a full set of motion information, while an AMVP candidate contains just one motion vector for a specific prediction direction and reference index. The candidates for both modes are derived similarly from the same spatial and/or temporal neighboring blocks, as described with respect to FIG. 5A, FIG. 5B, FIG. 6A, and FIG. 6B below.

According to aspects of this disclosure, as described in greater detail below, video encoder 20 and/or video decoder 30 may be configured to perform any combination of the techniques described herein for deriving motion information, performing block partitioning, and/or performing illumination compensation (IC).

Figure 3:
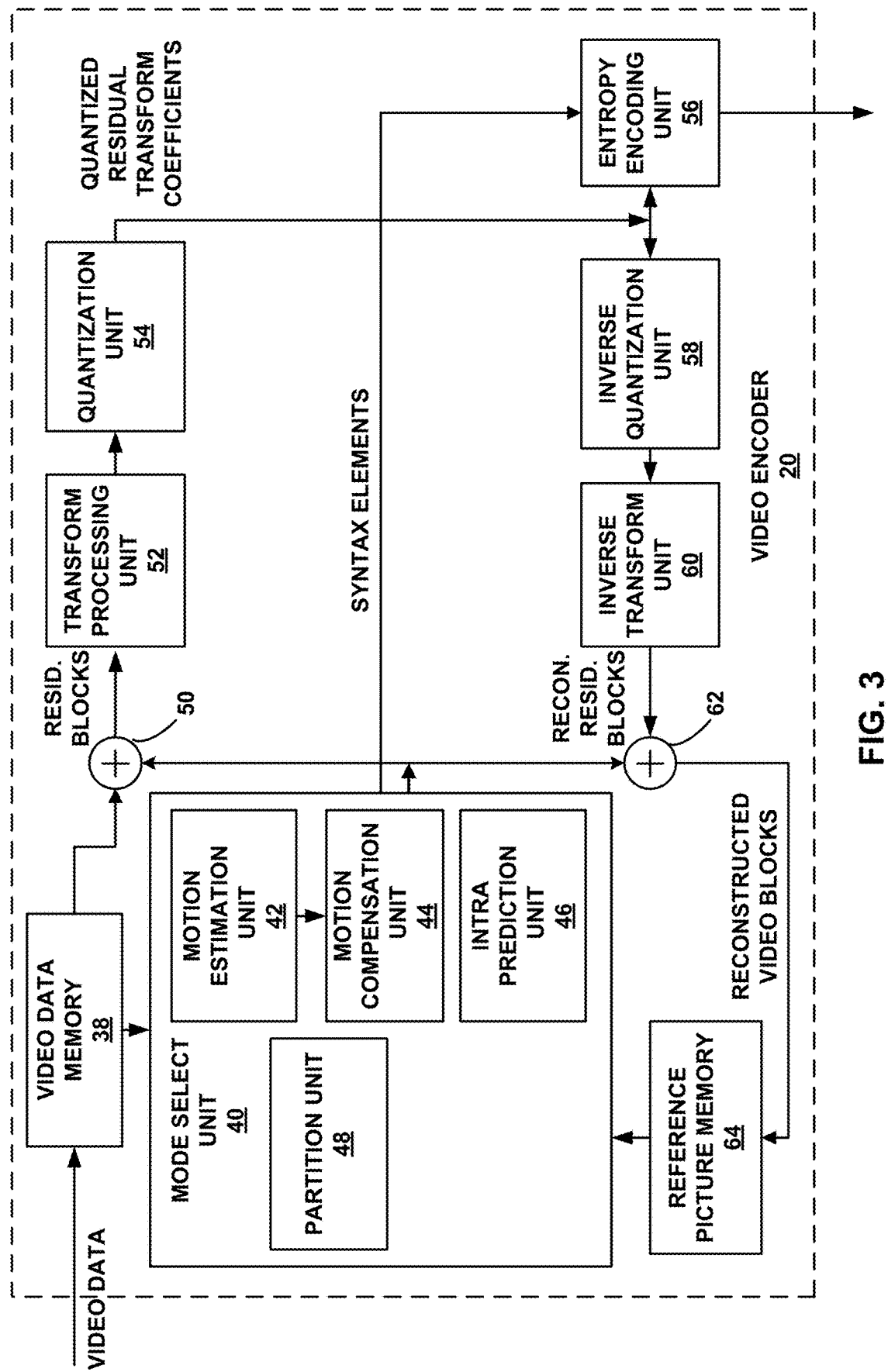
FIG. 3 is a block diagram illustrating an example of video encoder that may implement techniques of this disclosure.

FIG. 3 is a block diagram illustrating an example of video encoder 20 that may implement techniques for deriving motion information, performing block partitioning, and/or performing illumination compensation (IC). Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 3, video encoder 20 receives a current video block within a video frame to be encoded. In the example of FIG. 3, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a decoded picture buffer (DPB) that stores reference video data (e.g., reference pictures) for use in encoding video data by video encoder 20 (e.g., in intra- or inter-coding modes). Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded in order to provide spatial prediction. Video encoder 20 may perform multiple coding passes (e.g., to select an appropriate coding mode for each block of video data).

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter (e.g., based on error results or other suitable factors), and may provide the resulting intra- or inter-coded block to summer 50 to generate residual block data and to summer 62 to reconstruct the encoded block for use as a reference picture or frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors. As further described herein, motion vectors estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded (in terms of pixel difference), which may be determined by sum of absolute difference (SAD), sum of square difference (SSD), sum of square error (SSE), sum of absolute transformed difference (SATD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some examples, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

According to aspects of this disclosure, as described herein, video encoder 20 may be configured to perform any combination of the techniques described herein for performing illumination compensation (IC). In particular, certain techniques of this disclosure may be performed by motion estimation unit 42, motion compensation unit 44, and/or mode select unit 40. For example, IC parameters and/or IC status may be derived by the motion estimation unit 42 and/or the motion compensation unit 42. Further, mode select unit 40 may generate IC flags associated with video blocks, slices, pictures, sequences, etc. and may include them in the encoded bitstream for use by video decoder 30 in decoding the video blocks.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes (e.g., during separate encoding passes), and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data (received from mode select unit 40) from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, (e.g., for later use as a reference block). Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 4:
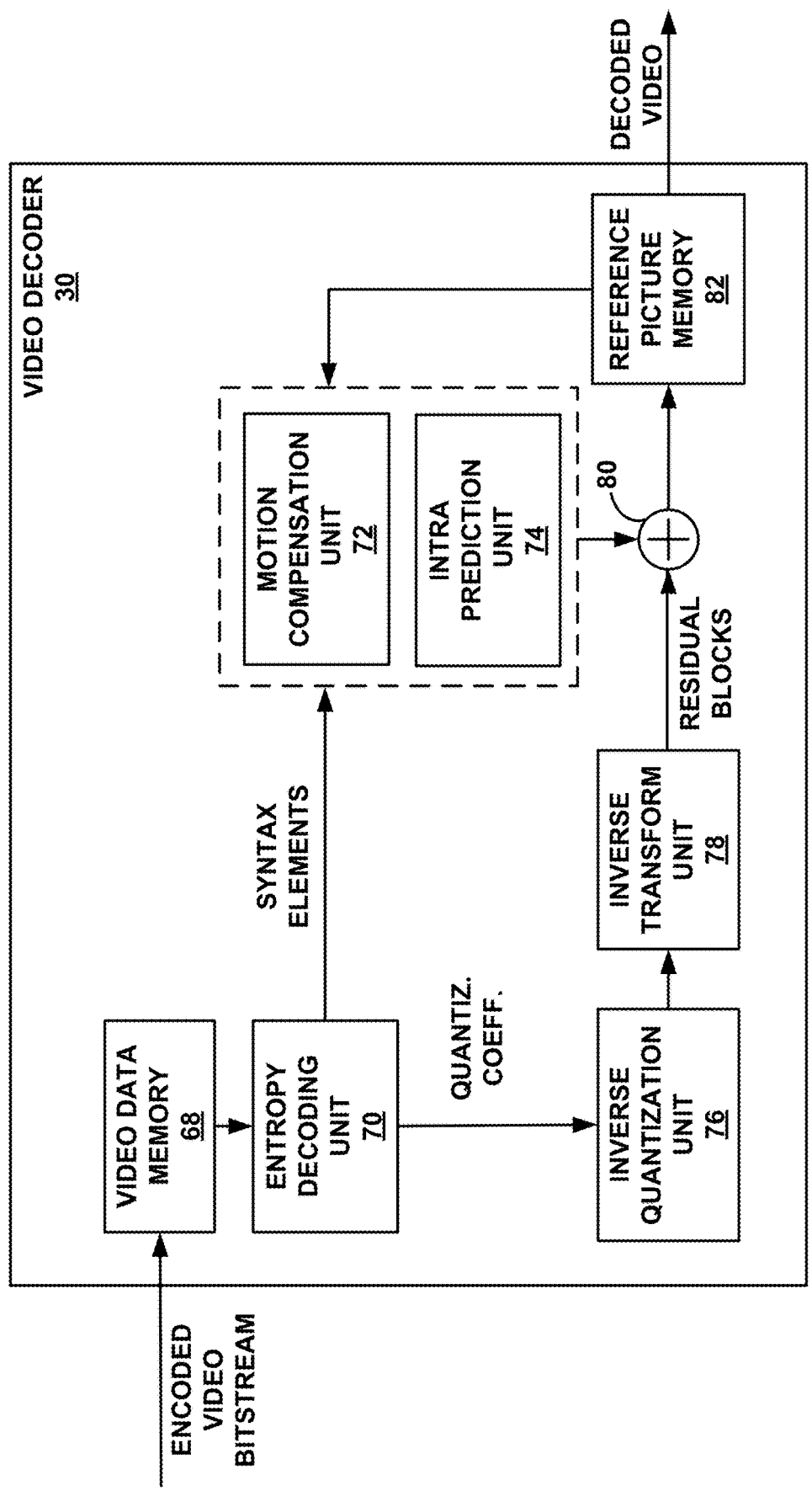
FIG. 4 is a block diagram illustrating an example of video decoder that may implement techniques of this disclosure.

FIG. 4 is a block diagram illustrating an example of video decoder 30 that may implement techniques for deriving motion information, performing block partitioning, and/or interpolating video data. In the example of FIG. 4, video decoder 30 includes video data memory 68, an entropy decoding unit 70, motion compensation unit 72, intra prediction unit 74, inverse quantization unit 76, inverse transformation unit 78, reference picture memory 82 and summer

80. Video decoder 30 may, in some examples, perform a decoding pass generally reciprocal to the encoding pass described with respect to video encoder 20 (FIG. 3). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a DPB that stores reference video data for use in decoding video data by video decoder 30 (e.g., in intra- or inter-coding modes). Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When a video slice is coded as an intra-coded (I) slice, intra prediction unit 74 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

According to aspects of this disclosure, video decoder 30 may be configured to perform any combination of the techniques described herein for performing illumination compensation (IC). In particular, motion compensation unit 72 may be configured to derive and/or apply IC status and/or IC parameters for predictive blocks.

Inverse quantization unit 76 inverse quantizes (or de-quantizes) the quantized transform coefficients provided in the bitstream and decoded by entropy decoding unit 70. The inverse quantization process may include use of a quantization parameter $QPU_Y$ calculated by video decoder 30 for each video block in the video slice to determine a degree of quantization and, likewise, a degree of inverse quantization that should be applied.

Inverse transform unit 78 applies an inverse transform (e.g., an inverse DCT, an inverse integer transform, or a conceptually similar inverse transform process) to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 5B:
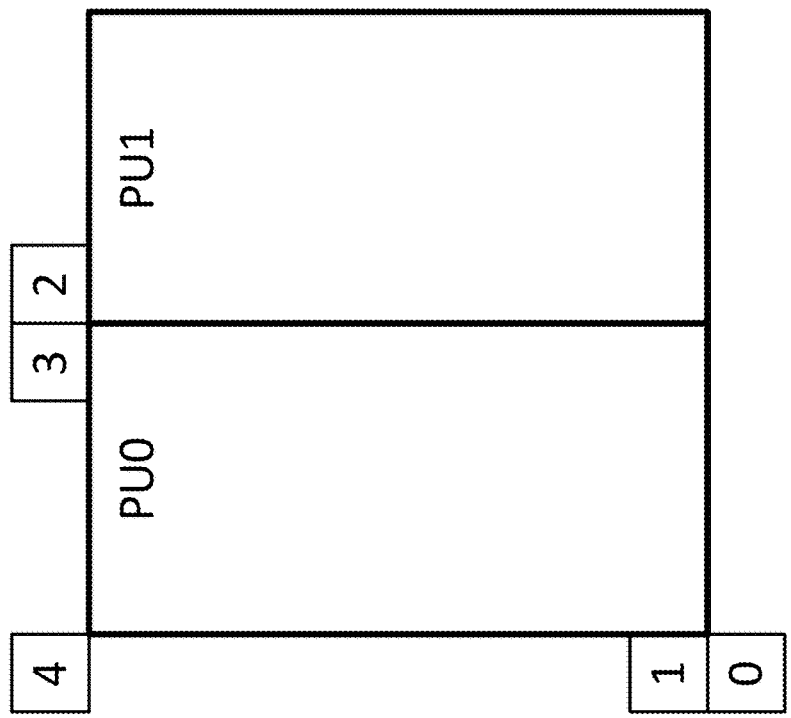
FIG. 5A and FIG. 5B are conceptual diagrams illustrating example spatial neighboring motion vector candidates for a merge mode and an advanced motion vector prediction (AMVP) mode.
Figure 5A:
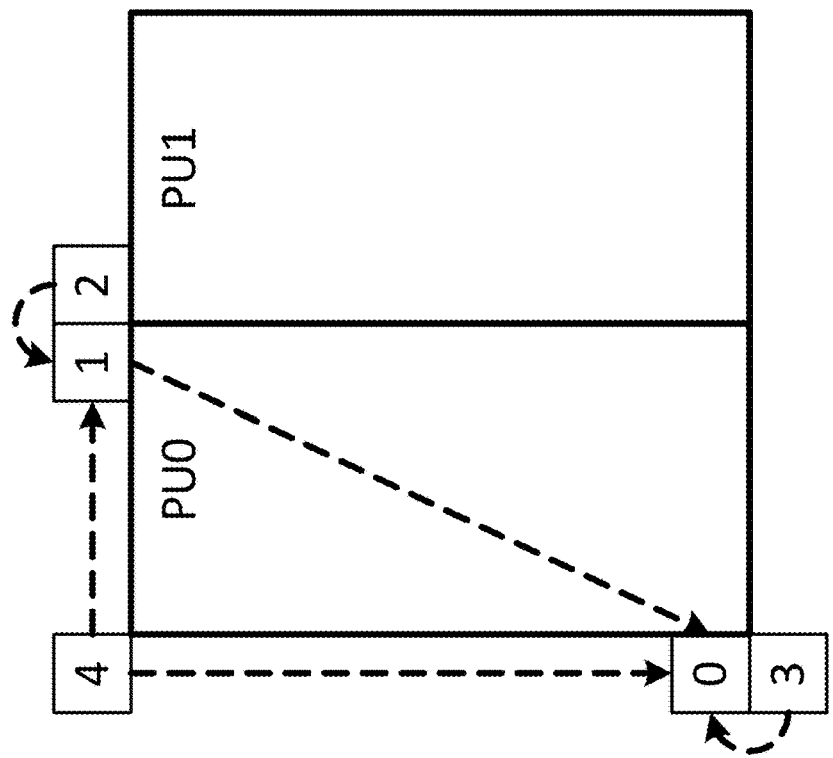

As previously described, two inter-prediction modes can be used for inter-prediction, including merge mode and AMVP mode. In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction. The candidates for both modes can be derived from spatial and/or temporal neighboring blocks. For example, FIG. 5A and FIG. 5B include conceptual diagrams illustrating spatial neighboring candidates in HEVC. FIG. 5A illustrates spatial neighboring motion vector (MV) candidates for merge mode. FIG. 5B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 5A, up to four spatial MV candidates can be derived with respect spatially neighboring motion data positions shown with numbers 0-4 in FIG. 5A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 5B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 6B:
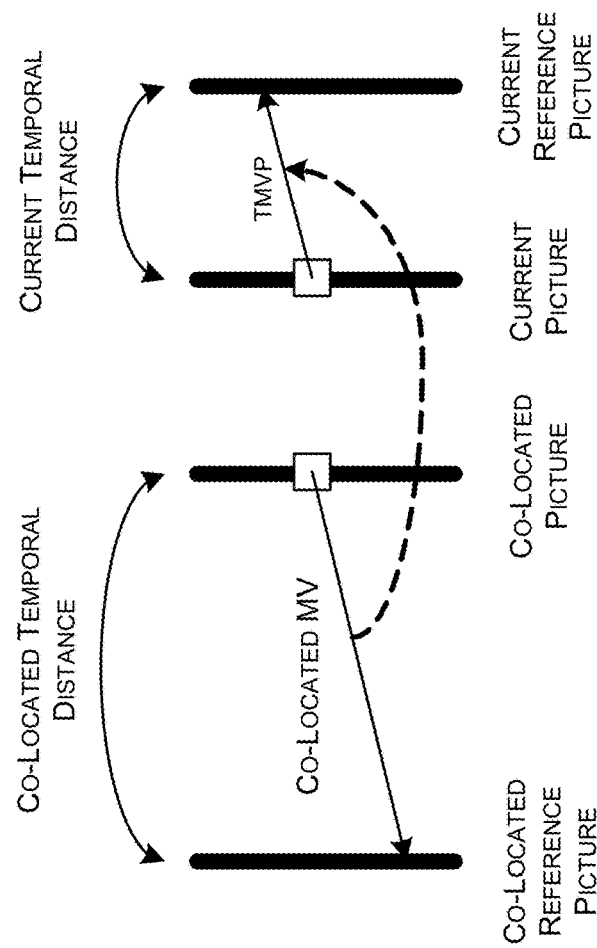
FIG. 6A and FIG. 6B are conceptual diagrams illustrating an example temporal motion vector predictor (TMVP) candidate and motion vector scaling.
Figure 6A:
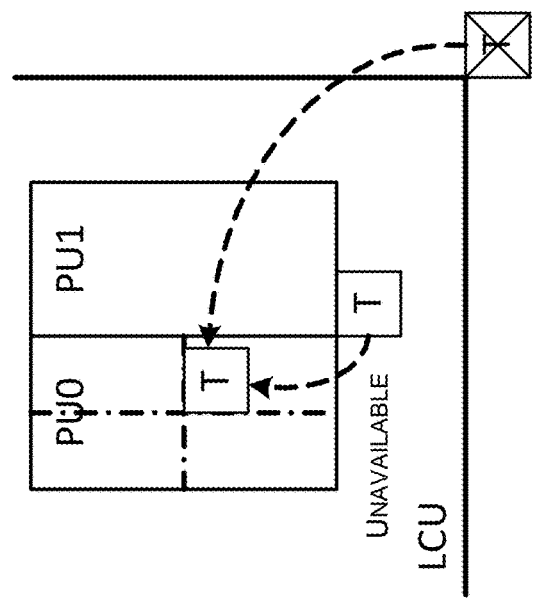

FIG. 6A and FIG. 6B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 6A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. It can be assumed that the value of motion vectors is proportional to the distance of pictures in the presentation time. A motion vector associates two pictures, the reference picture and the picture containing the motion vector (namely the containing picture). When a motion vector is utilized to predict the other motion vector, the distance of the containing picture and the reference picture is calculated based on the Picture Order Count (POC) values. For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect includes artificial motion vector candidate generation. For example, if a motion vector candidate list is not complete, artificial motion vector candidates can be generated and inserted at the end of the list until all candidates are obtained. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Another aspect of merge and AMVP modes includes a pruning process for candidate insertion. For example, candidates from different blocks may happen to be the same, which decreases the efficiency of a merge and/or an AMVP candidate list. A pruning process can be applied to solve this problem. The pruning process compares one candidate against the others in the current candidate list to avoid inserting identical candidate in certain extent. To reduce the complexity, only limited numbers of the pruning process can be applied instead of comparing each potential candidate with all the other existing candidates.

Figures 7A, 7B:
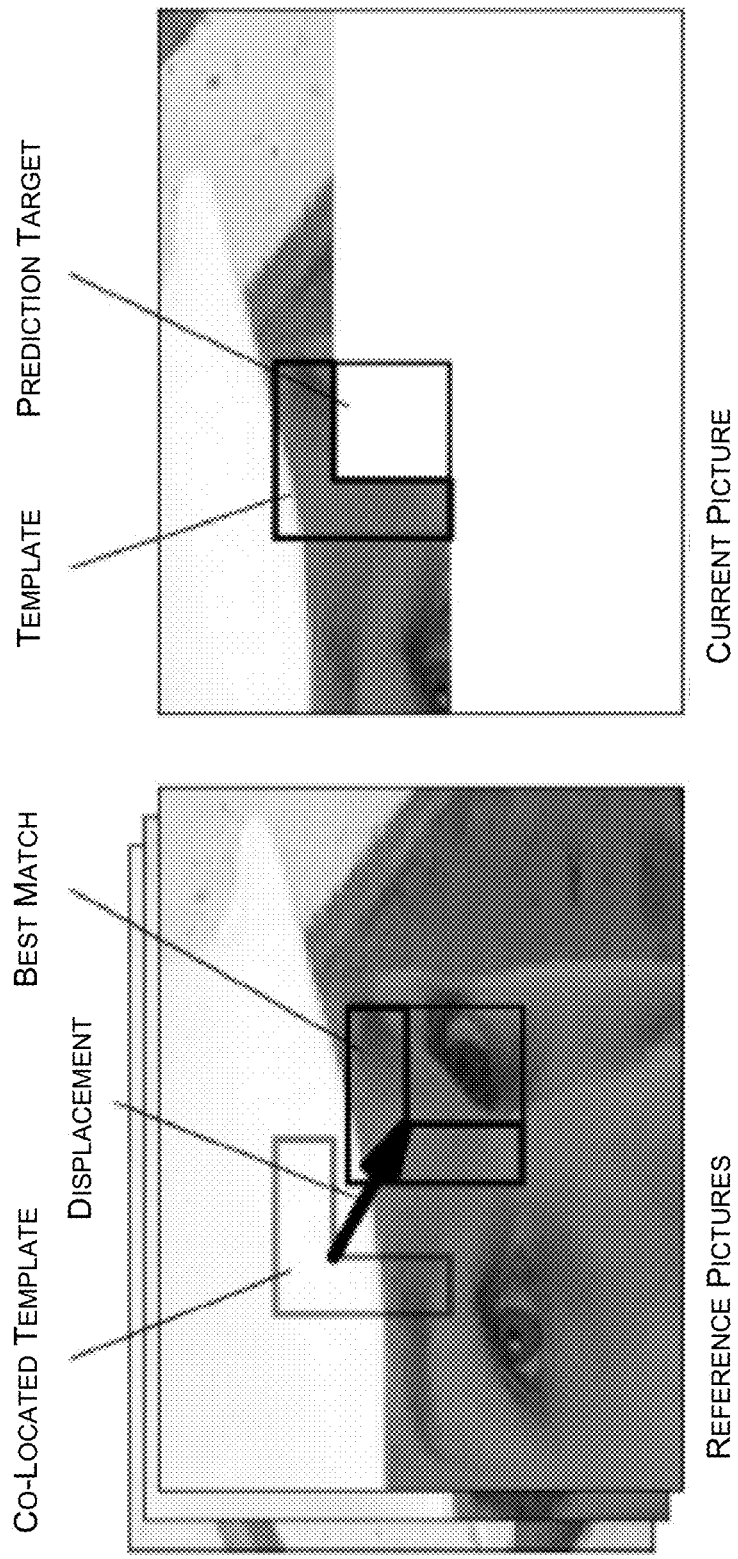
FIG. 7A and FIG. 7B are conceptual diagrams illustrating an example of template matching based decoder side motion vector derivation (DMVD).

In some cases, a decoder can derive motion vectors. For example, with the advent of advanced video codecs, the bit percentage of motion information in bitstream has increased. To reduce the bit cost of motion information, decoder side motion vector derivation (DMVD) was proposed. FIG. 7A and FIG. 7B are conceptual diagrams illustrating an example of template matching based DMVD. Template matching based DMVD shows good coding efficiency improvement. With template matching based DMVD, instead of searching a best match for the prediction target, which is the current block at the decoder, a best match of a template is searched in the reference frame. Assuming the template and the prediction target are from the same object, the motion vector of the template can be used as the motion vector of the prediction target. Since the template matching is conducted at both the encoder and decoder, the motion vector can be derived at the decoder side to avoid signaling cost.

Figure 8:
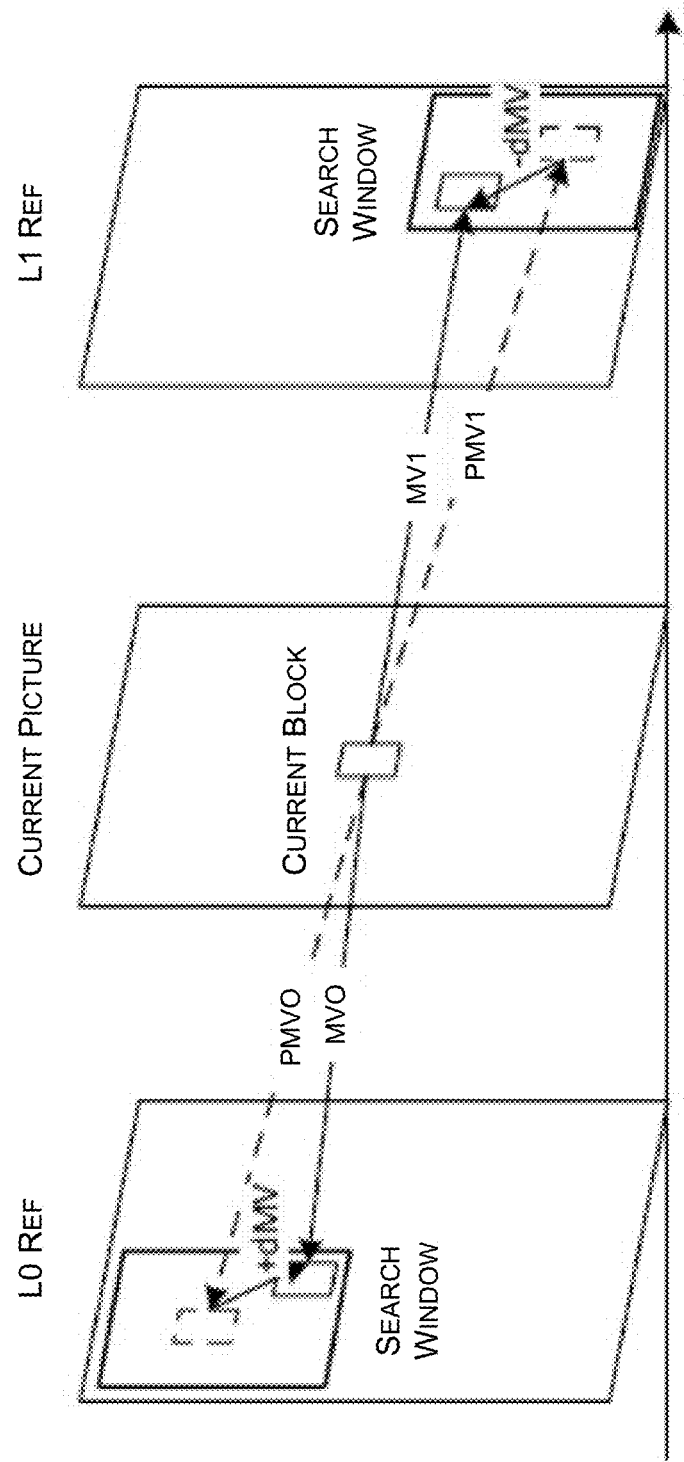
FIG. 8 is a conceptual diagram illustrating an example of mirror based bi-directional motion vector derivation in DMVD.

Another category of DMVD is mirror based bi-directional MV derivation. FIG. 8 is a conceptual diagram illustrating an example of mirror based bi-directional motion vector derivation in DMVD. Mirror based bi-directional MV derivation is similar to bilateral motion estimation in frame rate up-conversion. Mirror-based MV derivation is applied by centro symmetric motion estimation around search centers in fractional sample accuracy. The size and/or location of a search window may be pre-defined and may be signaled in bit stream. dMV in FIG. 8 is an offset which is added to PMV0 and is subtracted from PMV1 to generate a MV pair, MV0 and MV1.

All the values of dMV inside the search window will be checked and the Sum of Absolute Difference (SAD) between the L0 and L1 reference blocks is used as the measurement of Centro-symmetric motion estimation. The MV pair with the minimum SAD is selected as the output of Centro-symmetric motion estimation. Since the method needs a future reference (reference at a temporal position later than the current frame) and an earlier reference (reference at a temporal position earlier than the current frame) for the SAD matching, it cannot be applied to P frame or low-delay B frames in which only a former reference is available.

Figure 9:
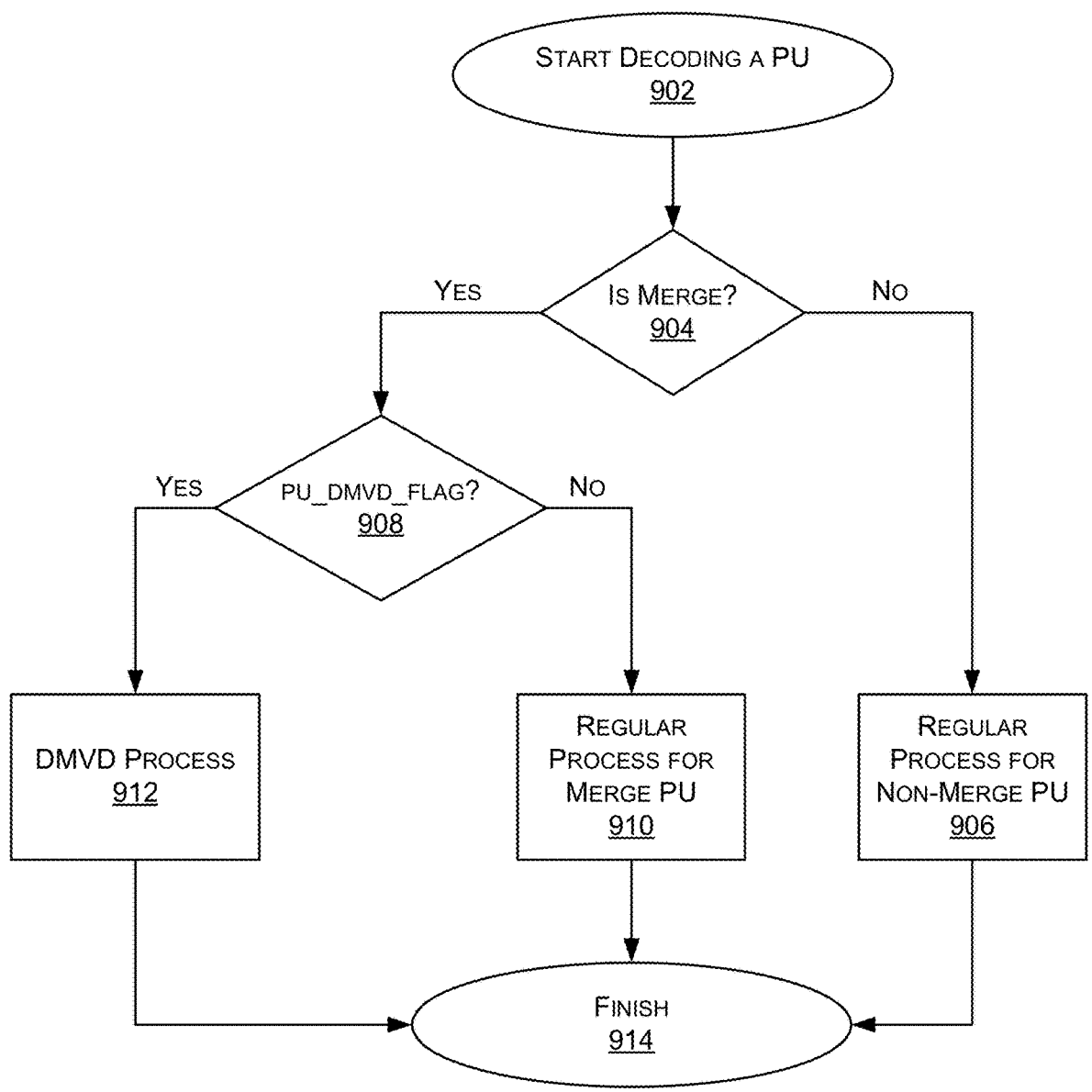
FIG. 9 is a flowchart illustrating an example of decoding a prediction unit (PU) using DMVD.

FIG. 9 is a flowchart illustrating an example of decoding a prediction unit (PU) using DMVD. It has been proposed to combine the mirror based bi-directional MV derivation with merge mode in HEVC. For example, a flag called pu_dmvd_flag can be added for a PU of B slices to indicate if DMVD mode is applied to the current PU. Since DMVD mode does not explicitly transmit any MV information in the bitstream, the decoding process of integrating pu_dmvd_flag with the syntax of merge mode in HEVC coding process is presented, as shown in FIG. 9.

For example, at 902, a decoder can start decoding a PU. At 904, the decoder can determine if a merge mode is enabled. If merge is not enabled, at 906, the decoder performs a regular process for non-merge PU. In the event merge is enabled, at 908, the decoder can determine whether a pu_dmvd_flag is present or includes a certain value (e.g., a 0 or 1) indicating DMVD mode is to be applied. If the pu_dmvd_flag is present or includes the value indicating DMVD mode is to be applied, the decoder performs the DMVD process at 912. Otherwise, the decoder can perform the regular merge process for a merge PU. The process finishes at 914.

Further, as noted above, a block/PU can be split into one or more (non-overlapped) sub-PUs or sub-blocks based on any motion derivation method. When a PU is split into multiple smaller sizes of sub-PUs, each sub-PU can have a unique set of motion information derived. For example a 32×32 PU can be split into 16 8×8 sub-PUs and each of the 8×8 sub-PU may have different reference indices and/or motion vectors. Such a size of the sub-PU can be even as small as 4×4, 2×2, or 1×1. Note that here the term PU is used interchangably with block and the term sub-PU is used interchangably with sub-block.

The size of the sub-block and/or sub-PU can be pre-defined and fixed regardless the size of the block and/or PU. Alternatively, a split depth D and a minimal sub-PU and/or sub-block size are predefined or signaled to indicate the target size of the sub-block or sub-PU to which the current block or PU shall be split into. The target size is the larger one between the minimal sub-PU or sub-block size and the size obtained by splitting the current block D times in a manner of quadtree.

For each sub-PU, searching of its unique motion information may include taking the motion information of the whole block as the search center (initial search point) and refining the motion for the sub-block. In some instances, the search center of each sub-PU may be derived from a list of starting point candidates.

Other characteristics also apply to sub-PUs and/or sub-blocks. For example, refinement of the motion vector can be applicable to sub-blocks one by one separately. Further, motion vector filtering may be performed for a sub-PU to correct isolated wrong motion vector. For instance, a median filter with a motion vector of a current sub-PU and motion vectors of (up to) four neighboring sub-PUs as input may be used. Also, when applying transform, the whole PU can be regarded as a whole block so that transform may cross sub-PU boundaries. In some instances, a transform is applied to each sub-PU such that transform size is no larger than sub-PU size.

Techniques and systems are described herein for performing illumination compensation (IC) in video coding. For example, techniques and systems are described for deriving IC parameters for each coding unit, prediction unit (PU), and/or sub-PU based on reconstructed spatial neighboring samples. In some embodiments, the IC parameters can be derived in one or more prediction directions. According to some embodiments, a video coder (e.g., a video encoder or a video decoder) may derive IC parameters and/or signal whether a block uses IC when being coded in a bitstream. For example, the video coder may insert IC information including at least one or more of an indication of how IC is used, an indication of the IC parameters used, the IC parameters themselves in the encoded bitstream, or any combination thereof. The video coder may further decode the encoded bitstream based on the IC information in the encoded bitstream. The techniques described herein can be applied individually, or any combination of the techniques described herein may be applied together.

According to some aspects, whether and how IC is used for a picture or a portion of a picture (e.g., a block, slice, coding unit, PU, sub-PU, or the like) may be indicated in a plurality of different ways in the encoded bitstream, with each indicating a different manner in which IC is used for the picture or portion of the picture. Accordingly, techniques discussed herein may be able to handle local illumination variation, and may not require IC flags to be explicitly signaled in certain situations, thereby increasing coding efficiency. In some aspects, the IC flag is explicitly signaled for a CU, PU, and/or block coded with AMVP mode. When a CU, PU, and/or block is coded with merge mode, the IC parameters of the CU, PU, and/or block is copied from that/those of the neighboring block indicated by the merge index.

The IC parameters can be derived using one or more different techniques described herein or otherwise known in the art. IC parameters can include one or more of a scaling factor, and offset, or a scaling factor and an offset, as described in more detail below. In some aspects, the IC parameters for a block (e.g., a CU, PU, sub-PU, or other block) can be derived based on one or more of the neighboring samples (e.g., pixels) of the current block (e.g., a CU that contains the current CU, PU, sub-PU or other block) and the corresponding samples (corresponding to the neighboring samples of the current block) in a reference picture identified by the motion information of the current block. In some examples, the IC parameters can be derived for the block for each prediction direction. In some examples, the neighboring samples can include reconstructed spatially neighboring samples, which may be selected using techniques such as partition based illumination compensation (PBIC).

In some aspects, where a sub-PU based temporal and/or spatial prediction mode is used, representative motion information (e.g., prediction direction, and a reference index and motion vector in each prediction direction) is generated from the temporal and/or spatial neighboring block of a sub-PU for pruning sub-PU temporal and/or spatial merge candidates with other merge candidates. Accordingly, the representative motion information is used to identify the corresponding samples (corresponding to the neighboring samples of the current block) in a reference picture. Alternatively, in some aspects, each sub-PU uses its own motion information to identify the corresponding samples (corresponding to the neighboring samples of the current block) in a reference picture.

In some aspects, the IC parameters for a current block (e.g., PU, sub-PU, or the like) may be derived from reconstructed and/or predicted spatially neighboring samples of the current block and their corresponding samples (e.g., identified by motion information of the current block) in the reference picture.

In further aspects, the IC parameters for a current block (e.g., PU, sub-PU) may be derived from only the already reconstructed spatially neighboring samples of the current block. For example, the spatially neighboring samples of the current PU or sub-PU that have already been reconstructed may be the common spatially neighboring samples of the current CU and the current PU or sub-PU.

In yet further aspects, for any of the above described aspects for deriving IC parameters, only a subset of the neighboring samples and/or their corresponding samples in the reference picture are used to derive IC parameters for a block. For example, only top neighboring samples, left neighboring samples, and/or samples that belong only to the current CTU row may be used. The subset of neighboring samples used may be indicated (e.g., using one or more bits) in the encoded bitstream at the block (e.g., CU and/or PU) level. Alternatively, the neighboring samples used may be pre-defined or signaled at a higher level syntax (e.g., CTB, slice, frame, etc.).

In some aspects, an IC model that can be used for inter prediction is as follows:

$$p(i,j) = a \cdot r(i+dv_x, j+dv_y) + b, \text{ where } (i,j) \in PU_c \quad (1)$$

Here, $PU_c$ is the current PU, (i, j) is the coordinate of pixels in $PU_c$, $(mv_x, mv_y)$ is the motion vector of PUc, p(i, j) is the prediction of $PU_c$, r is the PU's reference picture, and a and b are IC parameters of the linear IC model. For example, a is the scaling factor and b is the offset.

Figure 10A:
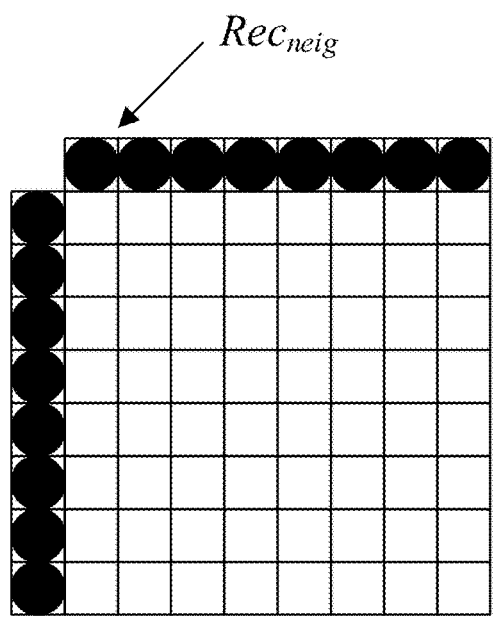
FIG. 10A and FIG. 10B are illustrations of the samples used for derivation of illumination compensation (IC) parameters for a current block.
Figure 10B:
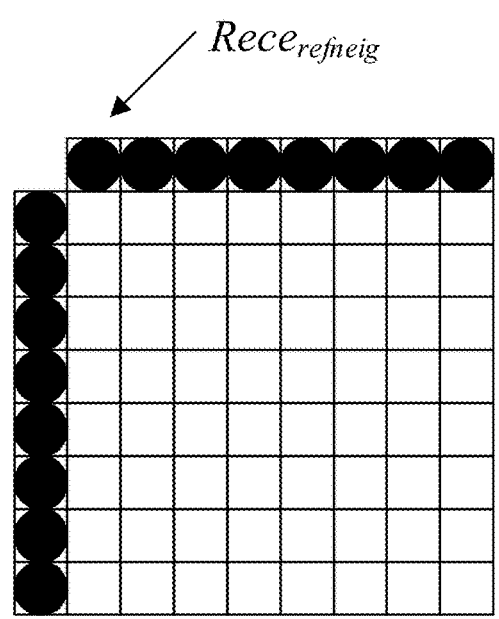

In some aspects, to estimate parameters a and b for a PU or other block, two sets of pixels are used. FIG. 10A and FIG. 10B show neighboring pixels used to estimate IC parameters. The two sets of pixels used to estimate IC parameters a and b for a PU are shown in FIG. 10A and FIG. 10B. The two sets of pixels include a first set including the available reconstructed neighboring pixels in left column and above row of the current CU (the CU that contains the current PU), and a second set including the corresponding neighboring pixels of the current CU's reference block. The reference block of current CU is found by using current PU's motion vector (shown as $(mv_x, mv_y)$ in equation 1). In some cases, the IC model of equation 1 can be used for local inter illumination variation.

To handle illumination variation on a more global scale (not only for local inter illumination variation), the IC parameters a and b can be calculated as:

Here, $Rec_{neig}$ and $Rec_{refneig}$ denote the used neighboring pixel set of the current CU and the neighboring pixel set of the current CU's reference block, respectively, and 2N denotes the pixel number in $Rec_{neig}$ and $Rec_{refneig}$.

In some examples, only a is used in a linear model and b is always set equal to 0. In some examples, only b is used and a is always set equal to 1. In some examples, both a and b are used. In some aspects, the IC parameters and/or an IC status (indicating the block's status of being coded with IC or not) may be explicitly signaled individually for a block. For example, the a and b IC parameters for a block can be signaled in an encoded bitstream in which the block is sent. In some examples, only the scaling factor a IC parameter for a block can be signaled in an encoded bitstream in which the block is sent. In some examples, only the offset b IC parameter for a block can be signaled in an encoded bitstream in which the block is sent.

As discussed above, in some aspects, IC parameters may be derived based on neighboring samples of a block. In some further aspects, additionally or alternatively, the IC parameters may be explicitly signaled (e.g., encoded in the bitstream) and/or inherited from neighboring blocks. In some aspects, the IC parameters (e.g., one or more scaling factor a and an offset b or only one of them) is explicitly signaled for a CU, PU, and/or a block coded with AMVP mode. When a CU, PU, and/or a block is coded with merge mode, IC parameters of the CU, PU, and/or block is copied from the IC parameters of the neighboring block indicated by the merge index. In some such aspects, the manner in which the IC parameters are to be derived for a block may be explicitly signaled, such as using an index (e.g., at the block level). For example, when IC is determined as being used for a block (e.g., explicitly signaled or derived based on other information), a list of IC parameters may be generated and/or an index signaled in the encoded bitstream to indicate which IC parameter candidate is used for the current block. The list of IC parameter candidates may include one or more of the following: IC parameters derived by using neighboring samples, IC parameters of the neighboring blocks, IC parameters derived by using a subset of the neighboring blocks, or any combination thereof. In some aspects, the IC parameters selected from the list may be selected based on a measure (e.g., sum of absolute difference (SAD), sum of square error (SSE), sum of absolute transformed difference (SATD), a sum of square difference (SSD), or other suitable measure) based on the reconstructed block using IC and the actual block being coded.

In some aspects, the IC parameters and/or index may be signaled at the block level (e.g., CU, PU, sub-PU). In some aspects, additionally or alternatively, the IC parameters and/or index may be signaled at the slice-level and used for blocks wherein the spatial neighboring samples are not available.

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

$$b = \frac{\sum_{i=0}^{2N-1} Rec_{neig}(i) - a \cdot \sum_{i=0}^{2N-1} Rec_{refneig}(i)}{2N} \quad (3)$$

In some aspects, IC may be signaled at one or more syntax levels (e.g., at the slice level, picture level, block level, or other suitable syntax level). For example, one or more IC flags may be included in one or more parameter sets (e.g., sequence parameter set, picture parameter set, or other headers or data structures associated with a particular syntax level) to indicate support of IC at the syntax level associated with the parameter set. For example, one IC flag may be used to indicate whether IC is enabled for the whole syntax level (e.g., slice). Additionally or alternatively, in some aspects, different IC flags may be used to separately indicate if IC is enabled for different components of the samples (e.g., one flag for luma, one flag for chroma) for the entire syntax level.

Additionally or alternatively, in some aspects, whether predictions should be made from a reference picture with our without IC may be indicated in the one or more parameter sets for the syntax level (e.g., slice, picture, block, or the like). For example, if a slice includes N reference pictures (or M pictures in the reference picture set (RPS) that can be used for the current picture), N (or M) syntax elements (e.g., one or more bits) can be signaled to indicate whether each of the reference pictures, when referred to by a specific block of the slice, can have IC enabled or not. Accordingly, at the block level, whether an IC flag should be explicitly present or not (e.g., like for AMVP mode which has a reference index signaled) may depend on the N (or M) syntax elements (bits) present, thus potentially avoiding additional signaling.

Figure 11:
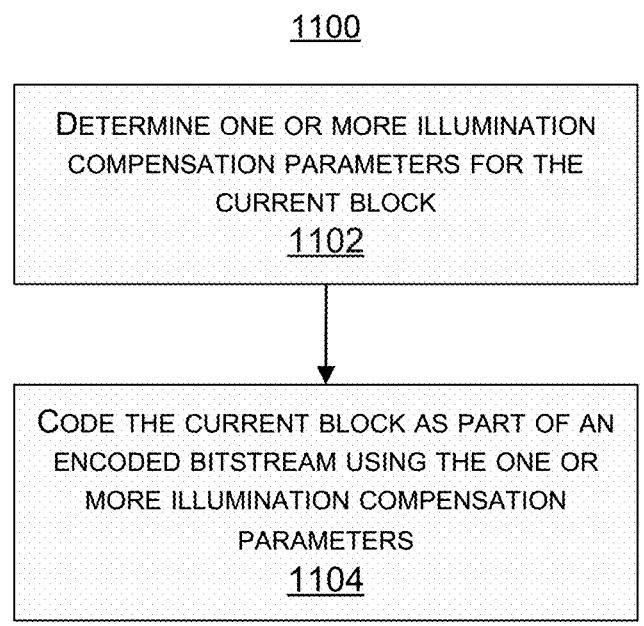
FIG. 11 is a flowchart illustrating an embodiment of a process of coding video data, in accordance with some embodiments.

FIG. 11 illustrates an embodiment of a process 1100 of coding video data. The process 1100 is implemented to derive one or more illumination compensation parameters and signal the illumination compensation parameters. In some aspects, the process 1100 may be performed by a computing device or an apparatus, such as the source device 12 or video encoder 20 shown in FIG. 1 or FIG. 3. For example, the computing device or apparatus may include an encoder, or a processor, microprocessor, microcomputer, or other component of an encoder that is configured to carry out the steps of process 1100.

Process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1102, the process 1100 includes determining one or more illumination compensation parameters for a current block. In some examples, the one or more illumination compensation parameters include at least one or more of a scale or an offset.

The illumination compensation parameters for the current block can be determined using equation 2, reproduced below:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

At 1104, the process 1100 includes coding the current block as part of an encoded bitstream using the one or more illumination compensation parameters. For example, an encoder (e.g., video encoder 20) can use the illumination compensation parameters to compensate variations in illumination (e.g., brightness) between the current block and at least one prediction block. In some embodiments, the illumination compensation parameters can be encoded as part of one or more syntax elements in the encoded bitstream. A decoder (e.g., video decoder 30) may decode the encoded bitstream based, at least in part, on the illumination compensation parameters in the encoded bitstream.

In some aspects, the process 1100 includes determining one or more spatially neighboring samples for the current block and deriving the one or more illumination compensation parameters for the current block based on at least one of the one or more spatially neighboring samples. In such aspects, the process 1100 includes coding the current block as part of the encoded bitstream using the one or more illumination compensation parameters, and signaling, individually, for the current block, an illumination compensation status in the encoded bitstream. In some examples, the illumination compensation status can include a flag or other indication of whether the current block is coded using illumination compensation.

In some aspects, the one or more spatially neighboring samples include one or more reconstructed spatially neighboring samples of the current block. In some aspects, the one or more spatially neighboring samples include one or more corresponding samples to the one or more reconstructed spatially neighboring samples of the current block in a reference picture identified by motion information associated with the current block. In some aspects, the motion information associated with the current block used to identify the one or more corresponding samples includes representative motion information of the current block when a sub-PU based temporal or spatial prediction mode is used for the current block. For instance, when a sub-PU based temporal and/or spatial prediction mode is used, representative motion information (e.g., prediction direction, and a reference index and motion vector in each prediction direction) can be generated from the temporal and/or spatial neighboring block of a sub-PU for pruning sub-PU temporal and/or spatial merge candidates with other merge candidates. In such instances, the representative motion information can be used to identify the corresponding samples (corresponding to the neighboring samples of the current block) in a reference picture. Alternatively, in some instances, each sub-PU uses its own motion information to identity the corresponding samples (corresponding to the neighboring samples of the current block) in a reference picture. In some examples, the motion information can include one or more motion vectors. In some aspects, the one or more spatially neighboring samples include the one or more reconstructed spatially neighboring samples of the current block and the one or more corresponding samples in the reference picture identified by the motion information associated with the current block. As noted previously, the one or more corresponding samples in the reference block of the reference picture correspond to the one or more reconstructed spatially neighboring samples of the current block. For example, the corresponding samples in the reference block of the reference picture can be identified using one or more motion vectors associated with the current block.

In some examples, the one or more spatially neighboring samples include a plurality of neighboring samples. In such examples, the at least one of the spatially neighboring samples includes less than all of the plurality of neighboring samples. For example, at least one spatially neighboring sample that is used to derive the one or more illumination compensation parameters for the current block can be less than the total number of spatially neighboring samples for the current block.

In some aspects, the process 1100 further includes signaling at least one of the one or more illumination compensation parameters for the current block in the encoded bitstream. For example, the process 1100 can signal, individually, for the current block, at least one of the one or more illumination compensation parameters. In some aspects, the process 1100 includes signaling one of the one or more illumination compensation parameters jointly for reference picture list 0 and reference picture list 1 for the current block in the encoded bitstream. For instance, the one or more illumination compensation parameters for both reference picture lists (list 0 and list 1) for the current block can be jointly signaled in the encoded bitstream. In one illustrative example, an index is signaled to indicate the value of illumination compensation parameters for both reference picture lists (list 0 and list 1). In some aspects, the current block is coded using an inter prediction mode that copies or derives motion information from a candidate block, in which case the one or more illumination compensation parameters are derived to be the same as one or more illumination compensation parameters of the candidate block. In one example, the current block is coded using a merge mode, and the one or more illumination compensation parameters for the current block are derived to be the same as the one or more illumination compensation parameters of the candidate block. In some examples, the candidate block is at least one or more of a spatial merge candidate, a temporal merge candidate, a bi-predictive merge candidate, or any other suitable merge candidate.

In some aspects, the illumination compensation status for the current block is explicitly signaled in the encoded bitstream when the current block is coded using an inter prediction mode that signals the motion information of the current block explicitly in the encoded bitstream.

In some aspects, the one or more illumination compensation parameters for the current block are explicitly signaled in the encoded bitstream when the current block is coded using an advanced motion vector prediction (AMVP) mode.

In some examples, the process 1100 includes deriving a list of multiple sets of one or more illumination compensation parameters for the current block. In such examples, signaling the one or more illumination compensation parameters comprises signaling a selection of one of the multiple sets. For example, when illumination compensation is determined as being used for the current block, the list of multiple sets of one or more illumination compensation parameters may be generated for the current block. In some examples, an index can be signaled in the encoded bitstream to indicate which illumination compensation parameter candidate is used for the current block. The list of multiple sets of one or more illumination compensation parameters may include a list of candidates, and may include one or more of the following: illumination compensation parameters derived by using neighboring samples, illumination compensation parameters of the neighboring blocks, illumination compensation parameters derived by using a subset of the neighboring blocks, or any combination thereof.

In some examples, the process 1100 includes signaling the illumination compensation parameters for a slice comprising the current block in a slice header. In some examples, the process 1100 includes signaling illumination compensation parameters for chroma and luma separately. In some examples, the process 1100 includes signaling the illumination compensation parameters for a CTU comprising the current block. In some examples, the process 1100 includes signaling the illumination compensation parameters for a group of blocks comprising the current block, or another other block level comprising the current block.

In some embodiments, illumination compensation (IC) use can be signaled when decoder side motion vector derivation (DMVD) is used. Further, when using DMVD mode (or in sub-PU based DMVD mode), the reliability of a candidate motion vector may be measured by the difference between two corresponding regions (e.g., regions that are similar) identified by the candidate motion vector. In some examples, the two corresponding regions can include a template in a current block and a template in a reference block or frame (e.g., in a template-based DMVD mode, as described with respect to FIG. 7A and FIG. 7B above). The difference can be determined using a sum of absolute difference (SAD), a sum of square difference (SSD), sum of square error (SSE), sum of absolute transformed difference (SATD), or other suitable difference measure. In some aspects, when the IC status of the current block (e.g., CU, PU, sub-PU) is true (indicating IC is used for the current block), the mean of the two corresponding regions may be removed first before calculating the difference between the two corresponding regions in order to measure the reliability of the candidate motion vector. In one example of calculating the mean of the two regions, for each block, the average luma, chroma, or other characteristic of each sample of the block is calculated and the average is subtracted from each sample. In such aspects, calculating the difference between the two corresponding regions may include performing a mean removed difference, such as a mean removed SAD, SSD, SSE, SATD, or other mean removed measure. Removing the mean of the two corresponding regions may partially eliminate the difference due to illumination differences between the corresponding regions that would be accounted for by IC. The IC parameters and/or IC status may then be signaled in the encoded bitstream.

In some aspects, alternatively, one of the corresponding regions may be considered the "current region" and the other corresponding region may be considered as a "reference region." IC parameters may be derived base on the neighboring samples of the current region and the neighboring samples of the reference region, and then applied to the reference region (creating an illumination compensated reference region). The difference between the current region and the illumination compensated reference region may then be used to measure the reliability of the candidate motion vector. The IC parameters and/or IC status may then be signaled in the encoded bitstream.

In some aspects, alternatively, IC may always be disabled for blocks coded with DMVD mode.

Figure 12:
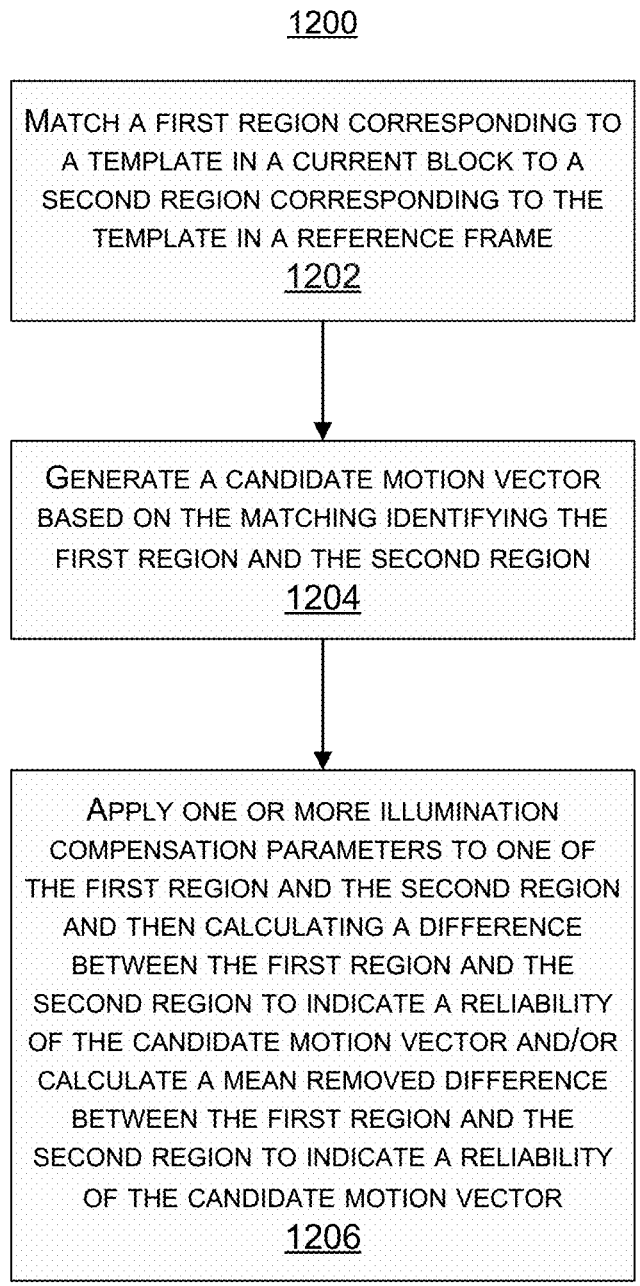
FIG. 12 is a flowchart illustrating an embodiment of a process of coding video data, in accordance with some embodiments.

FIG. 12 illustrates an embodiment of a process 1200 of coding video data. The process 1100 is implemented to measure the reliability of a candidate motion vector. In some aspects, the process 1200 may be performed by a computing device or an apparatus, such as the source device 12 or video encoder 20 shown in FIG. 1 or FIG. 3. For example, the computing device or apparatus may include an encoder, or a processor, microprocessor, microcomputer, or other component of an encoder that is configured to carry out the steps of process 1200. In some aspects, the process 1200 may be performed by a computing device or an apparatus, such as the destination device 14 or video decoder 30 shown in FIG. 1 or FIG. 4. For example, the computing device or apparatus may include a decoder, or a processor, microprocessor, microcomputer, or other component of a decoder that is configured to carry out the steps of process 1200.

Process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1202, the process 1200 includes matching a first region corresponding to a template in a current block to a second region corresponding to the template in a reference frame. For example, a template matching based DMVD can be used to match the first region to the second region.

At 1204, the process 1200 includes generating a candidate motion vector based on the matching identifying the first region and the second region.

At 1206, the process 1200 includes at least one or more of: applying one or more illumination compensation parameters to one of the first region and the second region and then calculating a difference between the first region and the second region to indicate a reliability of the candidate motion vector; and calculating a mean removed difference between the first region and the second region to indicate a reliability of the candidate motion vector. As noted previously, removing the mean of the two corresponding regions may partially eliminate the difference due to illumination differences between the corresponding regions that would be accounted for by IC. The difference between the current region and the illumination compensated reference region may be used to measure the reliability of the candidate motion vector. The IC parameters and/or IC status may then be signaled in the encoded bitstream.

In some embodiments, weighted prediction (WP) may be used in motion compensation. For example, WP may include applying a scaling factor (a), a shift number (s), and an offset (b) to a sample value in motion compensation. In one example, supposing the sample value in position (x,y) of a reference picture is p(x, y), then the value p'(x,y) (the scaled, shifted, offset value of p(x,y), based on a, s, and b), may be used instead of p(x,y) as the prediction value for motion compensation. For example, $$p'(x,y)=((a*p(x,y)+(1<<(s-1)))>>s)+b$$

In some aspects, for each reference picture of a current slice, a flag is signaled to indicate whether WP applies for the reference picture or not. If WP applies of a reference picture, a set of WP parameters (e.g., a, s, and b) may be sent as part of the encoded bitstream to the decoder to be used for motion compensation from the reference picture. In some aspects, there may be separate flags and parameters for WP for luma and chroma components of the reference picture.

In some aspects, both IC and WP can be enabled (e.g., for a slice, picture, sequence, etc.). Alternatively, in some aspects, IC and WP are not to both be enabled. Accordingly, in such aspects, if IC is explicitly enabled, WP is disabled, or if IC is explicitly disabled, WP is enabled. Alternatively, in some aspects, WP is not enabled for a particular profile or not used at all.

In some aspects, when both IC and WP are enabled (e.g., for a slice, picture, sequence), for any given block (e.g., CU, PU, sub-PU), only IC or WP is enabled, but not both at the same time. In some aspects, IC status is signaled (or derived) regardless of whether WP is enabled or not for the reference pictures that the current block is predicted from. Accordingly, in some aspects, when the IC status of a block is true, only IC applies for the block, without consideration of whether WP is enabled or not for the reference pictures that the current block is predicted from. Further, in some aspects, when the IC status of a block is false, WP may only apply when the current block is predicted from one or more reference pictures where WP is enabled.

In some aspects, alternatively, when both IC and WP are enabled (e.g., for a slice, picture, sequence), IC may be used in addition to (e.g., on top of) WP when the current block is predicted from one or more reference pictures where WP is enabled, and the IC status of the current block is true. For example, WP may be first applied to the reference block and neighboring samples of the current block and the reference block. The samples processed with WP parameters may be referred to as modified samples. The IC parameters may then be derived based on the modified neighboring samples of the current block and the reference block, and are applied to the modified reference block for generating the prediction block.

In some aspects, alternatively, when both IC and WP are enabled (e.g., for a slice, picture, sequence), IC may only be used when WP is disabled for the one or more reference pictures that the current block is predicted from. For example, when a block is only predicted from reference frames with WP enabled, the IC status is not signaled (or copied form a neighboring block) and is always set as false for the block. Accordingly, the IC status can be true (signaled or derived) only when a block is predicted (or in some aspects partially predicted) from at least one reference picture with weighted prediction disabled.

Hence, according to aspects of this disclosure, video encoder 20 or video decoder 30 may determine how to signal and apply illumination compensation to video blocks, or other portions of video. For example, video encoder 20 or video decoder 30 may determine IC parameters for video blocks based on neighboring samples. Further, video encoder 20 or video decoder 30 may determine the IC status of a block based on the motion information associated with a block and/or a type of inter-prediction mode (e.g., AVMP, DMVD, merge (e.g., types include spatial, temporal, bi-predictive, virtual uni-directional, etc.), OBMC, etc.) used. In yet another example, video encoder 20 or video decoder 30 may explicitly signal the use of IC for blocks encoded using an inter-prediction mode other than merge mode. In a further example, the video encoder 20 or video decoder 30 may indicate which of a plurality of IC parameters to use for a block. In another example, video encoder 20 or video decoder 30 may determine the reliability of a candidate motion vector based for DMVD based on the IC status of block. In yet further examples, the video encoder 20 or video decoder 30 may indicate IC status at the slice level, or a level associated with a parameter set. In further examples, the video encoder 20 or video decoder 30 may use IC in conjunction with WP.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
generating, by a decoding device, a list including multiple sets of one or more illumination compensation parameters for a current block, wherein at least one set of one or more illumination compensation parameters for the list is derived to be at least one illumination compensation parameter of a motion candidate block used for deriving motion information for the current block;
decoding, by the decoding device, an index from an encoded bitstream, the index indicating a set of one or more illumination compensation parameters of the multiple sets to select for the current block; and
decoding, by the decoding device, the current block using the set of one or more illumination compensation parameters, the set of one or more illumination compensation parameters compensating for variations in illumination between the current block and a prediction block, wherein decoding the current block transforms video data associated with the current block from a first state to a second state.

2. The method of claim 1, further comprising:
determining one or more spatially neighboring samples of the current block;
determining one or more spatially neighboring samples of a first reference block from a first reference picture associated with the current block, the first reference picture corresponding to a first prediction direction;
determining one or more spatially neighboring samples of a second reference block from a second reference picture associated with the current block, the first reference picture corresponding to a second prediction direction; and
determining at least one additional set of one or more illumination compensation parameters for the list based on the one or more spatially neighboring samples of the current block, the one or more spatially neighboring samples of the first reference block, and the one or more spatially neighboring samples of the second reference block.

3. The method of claim 2, wherein the one or more spatially neighboring samples of the current block include one or more reconstructed spatially neighboring samples of the current block.

4. The method of claim 2, wherein motion information associated with the current block is used to identify the one or more spatially neighboring samples of the first reference block and the one or more spatially neighboring samples of the second reference block, the motion information including representative motion information of the current block when a sub-prediction unit (PU) based temporal or spatial prediction mode is used for the current block.

5. The method of claim 2, wherein the one or more spatially neighboring samples of the current block used for determining the at least one set of one or more illumination compensation parameters include less than all of a plurality of neighboring samples of the current block.

6. The method of claim 2, wherein the one or more spatially neighboring samples of the current block include one or more samples from at least one of a top neighboring block or a left neighboring block of the current block, wherein the one or more spatially neighboring samples of the first reference block include one or more samples from at least one of a top neighboring block or a left neighboring block of the first reference block, and wherein the one or more spatially neighboring samples of the second reference block include one or more samples from at least one of a top neighboring block or a left neighboring block of the second reference block.

7. The method of claim 1, wherein the current block is coded using a merge mode.

8. The method of claim 7, wherein the motion candidate block is at least one or more of a spatial merge candidate, a temporal merge candidate, or a bi-predictive merge candidate.

9. The method of claim 1, wherein an illumination compensation status for the current block is explicitly signaled in the encoded bitstream when the current block is coded using an inter prediction mode that signals motion information of the current block explicitly in the encoded bitstream.

10. The method of claim 1, wherein one or more illumination compensation parameters for an additional block are explicitly signaled in an encoded bitstream when the additional block is coded using an advanced motion vector prediction (AMVP) mode.

11. The method of claim 1, wherein at least one illumination compensation parameter for a slice comprising the current block is signaled in a slice header.

12. The method of claim 1, wherein at least one illumination compensation parameter is signaled for chroma and luma separately for the current block.

13. The method of claim 1, wherein the at least one set of one or more illumination compensation parameters includes at least one scale factor and at least one offset.

14. An apparatus comprising:
a memory configured to store video data; and
a processor communicatively coupled to the memory, the processor configured to:
generate a list including multiple sets of one or more illumination compensation parameters for a current block, wherein at least one set of one or more illumination compensation parameters for the list is derived to be at least one illumination compensation parameter of a motion candidate block used for deriving motion information for the current block;

decode an index from an encoded bitstream, the index indicating a set of one or more illumination compensation parameters of the multiple sets to select for the current block; and decode the current block using the set of one or more illumination compensation parameters, the set of one or more illumination compensation parameters compensating for variations in illumination between the current block and a prediction block, wherein decoding the current block transforms video data associated with the current block from a first state to a second state.

15. The apparatus of claim 14, wherein the processor is configured to:

determine one or more spatially neighboring samples of the current block;

determine one or more spatially neighboring samples of a first reference block from a first reference picture associated with the current block, the first reference picture corresponding to a first prediction direction;

determine one or more spatially neighboring samples of a second reference block from a second reference picture associated with the current block, the first reference picture corresponding to a second prediction direction; and determine at least one additional set of one or more illumination compensation parameters for the list based on the one or more spatially neighboring samples of the current block, the one or more spatially neighboring samples of the first reference block, and the one or more spatially neighboring samples of the second reference block.

16. The apparatus of claim 15, wherein the one or more spatially neighboring samples of the current block include one or more reconstructed spatially neighboring samples of the current block.

17. The apparatus of claim 15, wherein the one or more spatially neighboring samples of the current block used for determining the at least one set of one or more illumination compensation parameters include less than all of a plurality of neighboring samples of the current block.

18. The apparatus of claim 15, wherein the one or more spatially neighboring samples of the current block include one or more samples from at least one of a top neighboring block or a left neighboring block of the current block, wherein the one or more spatially neighboring samples of the first reference block include one or more samples from at least one of a top neighboring block or a left neighboring block of the first reference block, and wherein the one or more spatially neighboring samples of the second reference block include one or more samples from at least one of a top neighboring block or a left neighboring block of the second reference block.

19. The apparatus of claim 14, wherein the current block is coded using a merge mode.

20. The apparatus of claim 19, wherein the motion candidate block is at least one or more of a spatial merge candidate, a temporal merge candidate, or a bi-predictive merge candidate.

21. The apparatus of claim 14, wherein an illumination compensation status for the current block is explicitly signaled in the encoded bitstream when the current block is coded using an inter prediction mode that signals motion information of the current block explicitly in the encoded bitstream.

22. The apparatus of claim 14, wherein one or more illumination compensation parameters for an additional block are explicitly signaled in an encoded bitstream when the additional block is coded using an advanced motion vector prediction (AMVP) mode.

23. The apparatus of claim 14, wherein at least one illumination compensation parameter for a slice comprising the current block is signaled in a slice header.

24. The apparatus of claim 14, wherein at least one illumination compensation parameter is signaled for chroma and luma separately for the current block.

25. The apparatus of claim 14, wherein the at least one set of one or more illumination compensation parameters includes at least one scale factor and at least one offset.

26. A non-transitory computer readable medium having stored thereon instructions that when executed by a processor cause the processor to perform operations including:

generating a list including multiple sets of one or more illumination compensation parameters for a current block, wherein at least one set of one or more illumination compensation parameters for the list is derived to be at least one illumination compensation parameter of a motion candidate block used for deriving motion information for the current block;

decoding an index from an encoded bitstream, the index indicating a set of one or more illumination compensation parameters of the multiple sets to select for the current block; and decoding the current block using the set of one or more illumination compensation parameters, the set of one or more illumination compensation parameters compensating for variations in illumination between the current block and a prediction block, wherein decoding the current block transforms video data associated with the current block from a first state to a second state.

27. The non-transitory computer readable medium of claim 26, further comprising instructions that when executed by a processor cause the processor to perform operations including:

determine one or more spatially neighboring samples of the current block;

determine one or more spatially neighboring samples of a first reference block from a first reference picture associated with the current block, the first reference picture corresponding to a first prediction direction;

determine one or more spatially neighboring samples of a second reference block from a second reference picture associated with the current block, the first reference picture corresponding to a second prediction direction; and determine at least one additional set of one or more illumination compensation parameters for the list based on the one or more spatially neighboring samples of the current block, the one or more spatially neighboring samples of the first reference block, and the one or more spatially neighboring samples of the second reference block.

28. The non-transitory computer readable medium of claim 27, wherein the one or more spatially neighboring samples of the current block include one or more reconstructed spatially neighboring samples of the current block.

29. The non-transitory computer readable medium of claim 27, wherein the one or more spatially neighboring samples of the current block used for determining the at least one set of one or more illumination compensation parameters include less than all of a plurality of neighboring samples of the current block.

30. The non-transitory computer readable medium of claim 27, wherein the one or more spatially neighboring samples of the current block include one or more samples from at least one of a top neighboring block or a left neighboring block of the current block, wherein the one or more spatially neighboring samples of the first reference block include one or more samples from at least one of a top neighboring block or a left neighboring block of the first reference block, and wherein the one or more spatially neighboring samples of the second reference block include one or more samples from at least one of a top neighboring block or a left neighboring block of the second reference block.

31. The non-transitory computer readable medium of claim 26, wherein the current block is coded using a merge mode.

32. The non-transitory computer readable medium of claim 31, wherein the motion candidate block is at least one or more of a spatial merge candidate, a temporal merge candidate, or a bi-predictive merge candidate.

33. The non-transitory computer readable medium of claim 26, wherein an illumination compensation status for the current block is explicitly signaled in the encoded bitstream when the current block is coded using an inter prediction mode that signals motion information of the current block explicitly in the encoded bitstream.

34. The non-transitory computer readable medium of claim 26, wherein one or more illumination compensation parameters for an additional block are explicitly signaled in an encoded bitstream when the additional block is coded using an advanced motion vector prediction (AMVP) mode.

35. The non-transitory computer readable medium of claim 26, wherein at least one illumination compensation parameter for a slice comprising the current block is signaled in a slice header.

36. The non-transitory computer readable medium of claim 26, wherein at least one illumination compensation parameter is signaled for chroma and luma separately for the current block.

37. The non-transitory computer readable medium of claim 26, wherein the at least one set of one or more illumination compensation parameters includes at least one scale factor and at least one offset.

38. An apparatus comprising:
means for generating a list including multiple sets of one or more illumination compensation parameters for a current block, wherein at least one set of one or more illumination compensation parameters for the list is derived to be at least one illumination compensation parameter of a motion candidate block used for deriving motion information for the current block;
means for decoding an index from an encoded bitstream, the index indicating a set of one or more illumination compensation parameters of the multiple sets to select for the current block; and
means for decoding the current block using the set of one or more illumination compensation parameters, the set of one or more illumination compensation parameters compensating for variations in illumination between the current block and a prediction block, wherein decoding the current block transforms video data associated with the current block from a first state to a second state.

39. The apparatus of claim 38, further comprising:
means for determining one or more spatially neighboring samples of the current block;
means for determining one or more spatially neighboring samples of a first reference block from a first reference picture associated with the current block, the first reference picture corresponding to a first prediction direction;
means for determining one or more spatially neighboring samples of a second reference block from a second reference picture associated with the current block, the first reference picture corresponding to a second prediction direction; and
means for determining at least one additional set of one or more illumination compensation parameters for the list based on the one or more spatially neighboring samples of the current block, the one or more spatially neighboring samples of the first reference block, and the one or more spatially neighboring samples of the second reference block.

40. The apparatus of claim 39, wherein the one or more spatially neighboring samples of the current block include one or more reconstructed spatially neighboring samples of the current block.

41. The apparatus of claim 39, wherein the one or more spatially neighboring samples of the current block used for determining the at least one set of one or more illumination compensation parameters include less than all of a plurality of neighboring samples of the current block.

42. The apparatus of claim 39, wherein the one or more spatially neighboring samples of the current block include one or more samples from at least one of a top neighboring block or a left neighboring block of the current block, wherein the one or more spatially neighboring samples of the first reference block include one or more samples from at least one of a top neighboring block or a left neighboring block of the first reference block, and wherein the one or more spatially neighboring samples of the second reference block include one or more samples from at least one of a top neighboring block or a left neighboring block of the second reference block.

43. The apparatus of claim 38, wherein the current block is coded using a merge mode.

44. The apparatus of claim 43, wherein the motion candidate block is at least one or more of a spatial merge candidate, a temporal merge candidate, or a bi-predictive merge candidate.

45. The apparatus of claim 38, wherein an illumination compensation status for the current block is explicitly signaled in the encoded bitstream when the current block is coded using an inter prediction mode that signals motion information of the current block explicitly in the encoded bitstream.

46. The apparatus of claim 38, wherein one or more illumination compensation parameters for an additional block are explicitly signaled in an encoded bitstream when the additional block is coded using an advanced motion vector prediction (AMVP) mode.

47. The apparatus of claim 38, wherein at least one illumination compensation parameter for a slice comprising the current block is signaled in a slice header.

48. The apparatus of claim 38, wherein at least one illumination compensation parameter is signaled for chroma and luma separately for the current block.

49. The apparatus of claim 38, wherein the at least one set of one or more illumination compensation parameters includes at least one scale factor and at least one offset.

50. The method of claim 2, wherein the first reference picture from the first prediction direction is from another temporal location as a picture including the current block.

51. The method of claim 1, wherein the motion candidate block includes a neighboring block of the current block.

52. The apparatus of claim 14, wherein the motion candidate block includes a neighboring block of the current block.

* * * * *